United States Patent
Horikawa

(10) Patent No.: US 8,310,689 B2
(45) Date of Patent: Nov. 13, 2012

(54) DOCUMENT MANAGING APPARATUS, DOCUMENT MANAGING SYSTEM, AND DOCUMENT MANAGING METHOD

(75) Inventor: Hirofumi Horikawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 458 days.

(21) Appl. No.: 12/707,863

(22) Filed: Feb. 18, 2010

(65) Prior Publication Data

US 2010/0220343 A1     Sep. 2, 2010

(30) Foreign Application Priority Data

Feb. 27, 2009   (JP) ................................. 2009-046562

(51) Int. Cl.
*G06K 15/02*   (2006.01)

(52) U.S. Cl. ........ 358/1.1; 358/1.15; 358/1.9; 358/1.18; 358/1.2

(58) Field of Classification Search .................. None
See application file for complete search history.

(56) References Cited

U.S. PATENT DOCUMENTS

| | | | | |
|---|---|---|---|---|
| 5,267,333 A * | 11/1993 | Aono et al. | ..................... | 382/166 |
| 5,745,664 A * | 4/1998 | Nomura et al. | ............. | 358/1.18 |
| 6,396,963 B2 * | 5/2002 | Shaffer et al. | ................. | 382/305 |
| 7,461,138 B2 * | 12/2008 | Mukaiyama et al. | ......... | 709/219 |
| 8,068,244 B2 * | 11/2011 | Uejo | ............................. | 358/1.14 |
| 2001/0000126 A1 * | 4/2001 | Kinjo | ............................. | 348/218 |
| 2005/0094206 A1 * | 5/2005 | Tonisson | ..................... | 358/1.18 |
| 2005/0179947 A1 * | 8/2005 | Kobashi et al. | .............. | 358/1.18 |
| 2006/0055961 A1 * | 3/2006 | Toda | ............................. | 358/1.15 |
| 2007/0041051 A1 * | 2/2007 | Tanaka | ........................ | 358/1.18 |
| 2007/0195370 A1 * | 8/2007 | Suga et al. | ................... | 358/1.18 |
| 2008/0010612 A1 * | 1/2008 | Ooyama et al. | ............... | 715/831 |
| 2008/0165383 A1 * | 7/2008 | Myoki | ......................... | 358/1.15 |
| 2008/0198394 A1 * | 8/2008 | Hamada et al. | ............... | 358/1.9 |
| 2008/0252938 A1 * | 10/2008 | Cazier et al. | ................. | 358/450 |
| 2008/0291502 A1 * | 11/2008 | Horikawa | ..................... | 358/448 |
| 2009/0009820 A1 * | 1/2009 | Fukui | ............................ | 358/449 |
| 2009/0174900 A1 * | 7/2009 | Shigehisa et al. | ............ | 358/1.15 |
| 2009/0195824 A1 * | 8/2009 | Kawasaki | .................... | 358/1.15 |
| 2010/0079798 A1 * | 4/2010 | Iguchi | .......................... | 358/1.15 |
| 2010/0195124 A1 * | 8/2010 | Has | ................................ | 358/1.9 |

FOREIGN PATENT DOCUMENTS

| | | |
|---|---|---|
| JP | 2006-074439 | 3/2006 |
| JP | 2007-200136 | 8/2007 |
| JP | 2008-293221 | 12/2008 |

* cited by examiner

*Primary Examiner* — King Poon
*Assistant Examiner* — Ted Barnes
(74) *Attorney, Agent, or Firm* — IPUSA, PLLC

(57) ABSTRACT

A disclosed device includes a document managing apparatus including an image data acquiring unit acquiring original data of original documents in a predetermined layout, a layout information storing unit storing IDs and layout information, an original document determining unit determining the IDs of the original documents, a partial area information storing unit storing partial area information for the original data respectively for the IDs, a partial area extracting unit, an arrangement information storing unit storing arrangement information on paper in association with the IDs respectively for the partial areas, a synthetic image data generating unit forming synthetic image data in conformity with the arrangement information and forming identification information into the synthetic image data, a data accumulating unit causing a data storing unit to store the identification information and the original data, and a printing unit that prints a synthetic document having the synthetic image data.

11 Claims, 27 Drawing Sheets

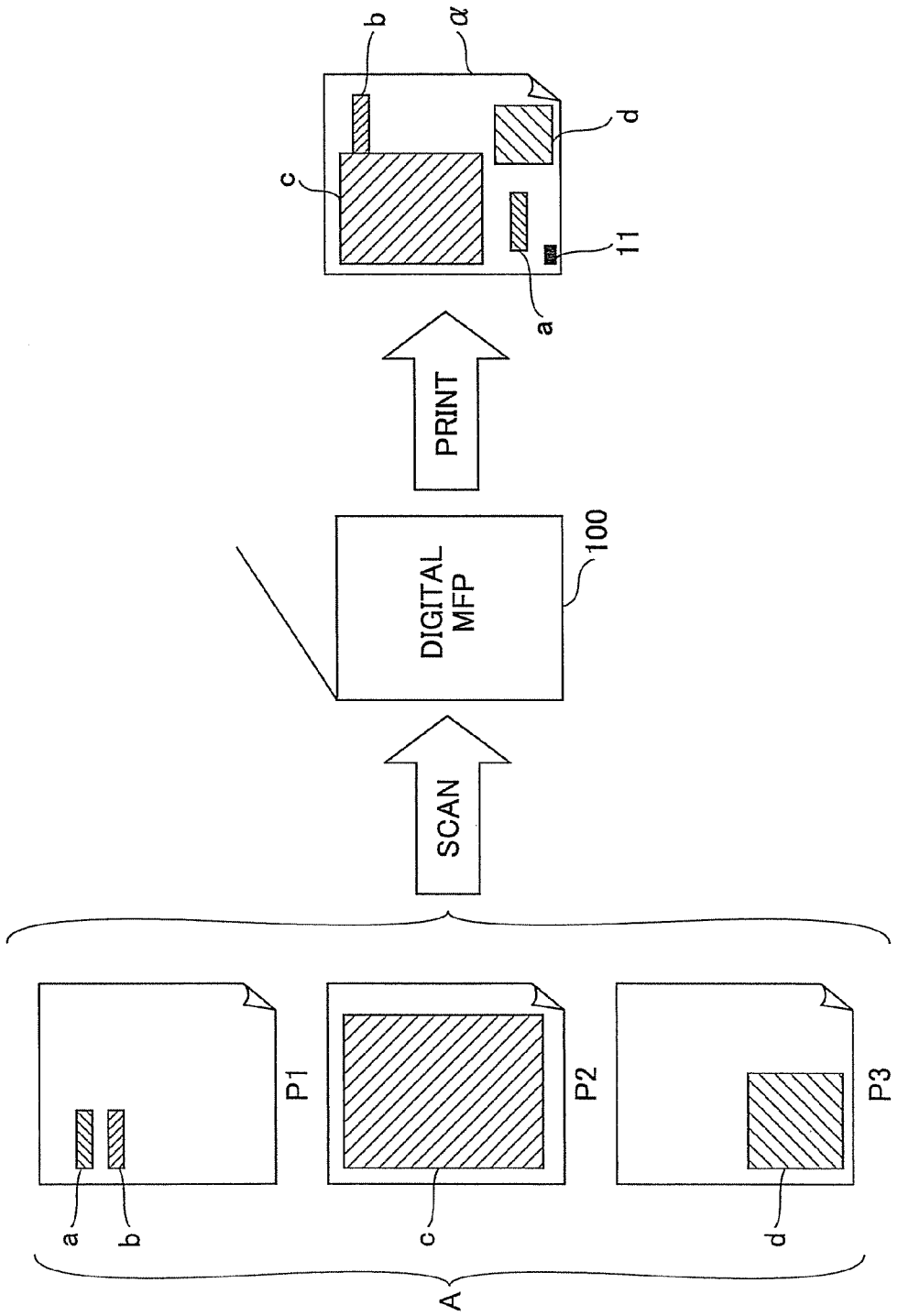

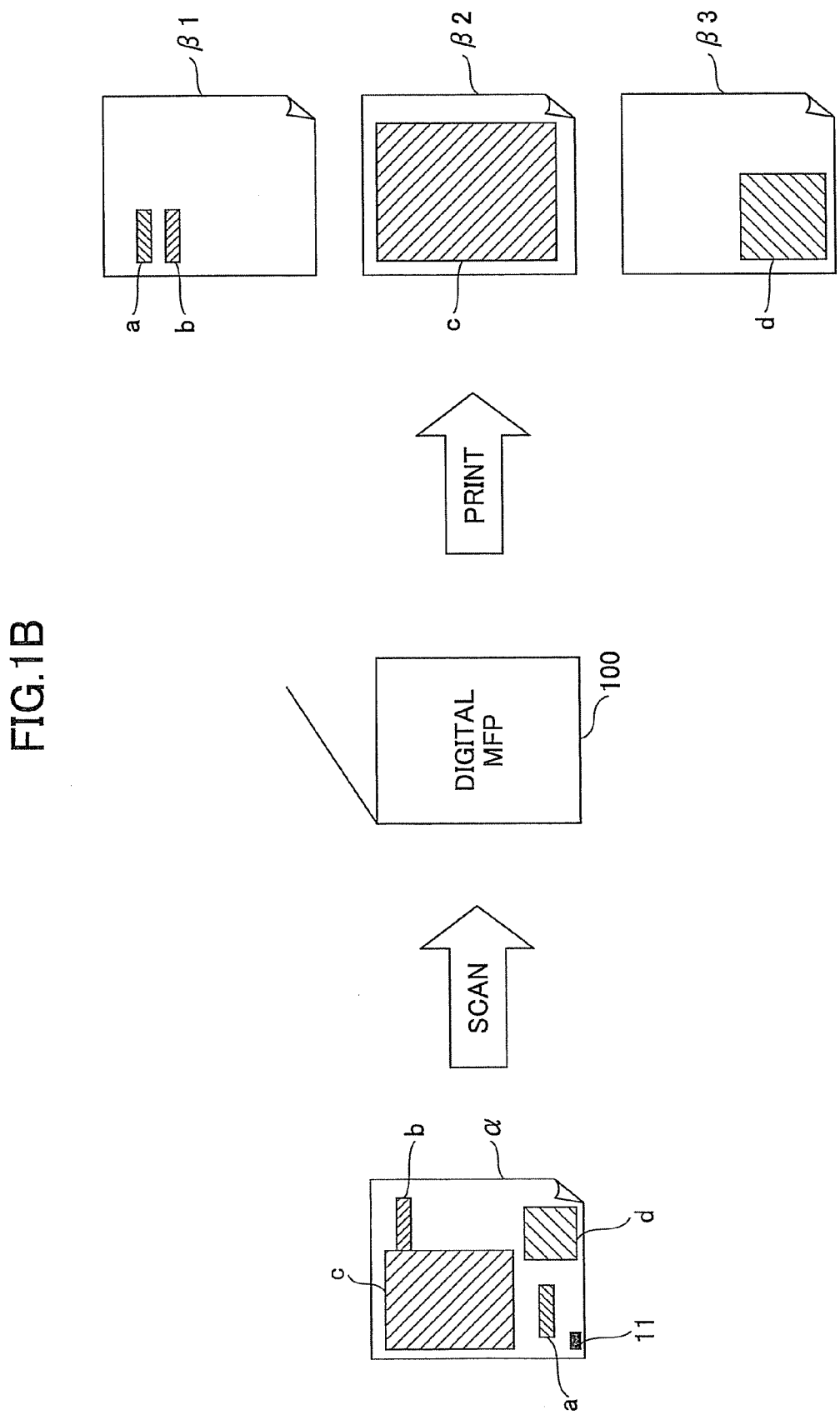

FIG.7

| FORM ID | IMAGE DICTIONARY | FORM DEFINITION FILE LOCATION |
|---|---|---|
| formId:00001 | c:\dict\0000a.dic | c:\formdef\f0001.xml |
| formId:00002 | c:\dict\0000b.dic | c:\formdef\f000 2.xml |
| .. | .. | .. |
| formId:0000f | c:\dict\000 c3.dic | c:\formdef\f000 f.xml |

```
<FORM NAME=' Incident/Accident Report' >
<DESIGN FILE NAME=' c:¥form¥form1.pdf' />
<PAGE PAGE NO.=' 1' >
    <EA AID=' r id:0001' NAME=' FULL NAME' LATERAL POSITION=' 167' LONGITUDINAL POSITION=' 164'
        WIDTH=' 130' HEIGHT=' 25' PROCESSING METHOD=' IMAGE STORAGE'
        COMPULSORY ENTRY=' TRUE' />
    <EA AID=' rid:0002' NAME=' MALE' LATERAL POSITION=' 333' LONGITUDINAL POSITION=' 170' WIDTH=' 14'
        HEIGHT=' 14' PROCESSING METHOD=' CHECK RECOGNITION' />
    <EA AID=' rid:0003' NAME=' FEMALE' LATERAL POSITION=' 381' LONGITUDINAL POSITION=' 170' WIDTH=' 14'
        HEIGHT=' 14' PROCESSING METHOD=' CHECK RECOGNITION' />
    <EA AID=' rid:0004' NAME=' AGE' LATERAL POSITION=' 476' LONGITUDINAL POSITION=' 164' WIDTH=' 25'
        HEIGHT=' 25' PROCESSING METHOD=' CHARACTER RECOGNITION' COMPULSORY ENTRY =' TRUE' />
    :
    <EA ...>
    :
    </EA>
</PAGE>
<ADDITIONAL MANAGEMENT ITEM>
    <LIST NAME=' WORKING STATUS' >
        <ITEM>CHECKING</ITEM>
        <ITEM>EXAMINING COUNTERMEASURE</ITEM>
        <ITEM>COUNTERMEASURE IS APPLIED</ITEM>
    </LIST>
    <TEXT NAME=' WHERE TO QUERY' />
</ ADDITIONAL MANAGEMENT ITEM >
</FORM>
```

(FORM DEFINITION)

FIG.10

| INPUT FORM ID | OUTPUT FORM ID |
|---|---|
| formId:00001 | formId:a0001 |
| formId:00002 | formId:a0002 |
| : | : |
| formId:0000f | formId:a000f |

```
<FORM NAME=' Incident/Accident Report' >
<DESIGN FILE NAME=' c:¥form¥form1.pdf' />
<PAGE PAGE NO.=' 1' >
  <IA NAME=' INSERTION IMAGE 1' LATERAL POSITION=' 40' LONGITUDINAL POSITION=' 260' WIDTH=' 80'
    HEIGHT=' 20' BACKGROUND=' {formId:00001/rid:0001}' />
  <IA NAME=' INSERTION IMAGE 2' LATERAL POSITION=' 180' LONGITUDINAL POSITION=' 40' WIDTH=' 80'
    HEIGHT=' 20' BACKGROUND=' {formId:00001/rid:0002}' />
  <IA NAME=' INSERTION IMAGE 3' LATERAL POSITION=' 20' LONGITUDINAL POSITION=' 20' WIDTH=' 150'
    HEIGHT=' 200' BACKGROUND=' {formId:00002/rid:0001}' />
    :
  <IA NAME=' INSERTION IMAGE 4' LATERAL POSITION=' 160' LONGITUDINAL POSITION=' 200' WIDTH=' 80'
    HEIGHT=' 80' BACKGROUND=' {formId:0000b/ rid:00a9}' />
  <SYMBOL NAME=' INSERTION IMAGE 4' LATERAL POSITION=' 20' LONGITUDINAL POSITION=' 300'
    WIDTH=' 30' HEIGHT=' 30' />
</PAGE>
</FORM>
```

(FORM DEFINITION)

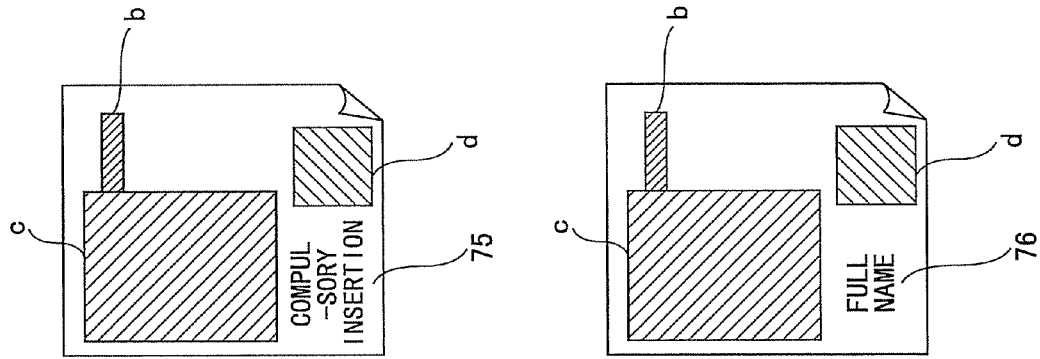
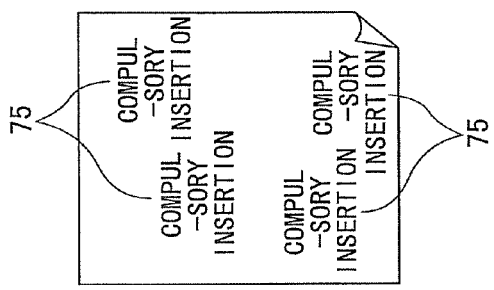
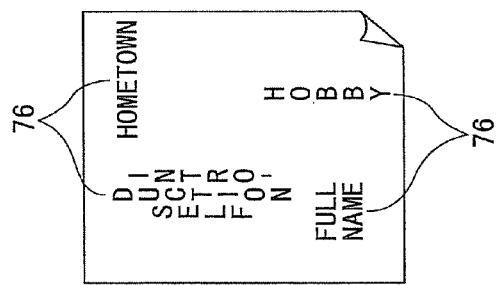
FIG.12C
FIG.12D

FIG.13

| CONTENTS DATA ID (CDID) | CONTENTS DATA LOCATION | ORIGINAL IMAGE DATA LOCATION | AREA ID (AID) | INPUT FORM ID (input FID) | OUTPUT PAPER ID (output PID) |
|---|---|---|---|---|---|
| contentsId:00001 | c:¥image¥contentsData¥0000a.jpg | c:¥image¥original¥10001.jpg | rId:0001 | formId:00001 | paperId:000001 |
| .. | .. | .. | .. | .. | .. |
| contentsId:00002 | c:¥image¥contentsData¥0000b.jpg | c:¥image¥original¥10001.jpg | rId:0002 | formId:00001 | paperId:000001 |
| contentsId:0000f | c:¥image¥contentsData¥0100c.jpg | c:¥image¥original¥10d2c.jpg | rId:00a9 | formId:0000b | paperId:000001 |
| .. | .. | .. | .. | .. | .. |
| contentsId:00014 | c:¥image¥contentsData¥01021.jpg | c:¥image¥original¥10d2c.jpg | rId:0001 | formId:0000b | paperId:000001 |
| .. | .. | .. | .. | .. | .. |
| contentsId:00e5d | c:¥image¥contentsData¥027dc.jpg | c:¥image¥original¥26ac2.jpg | rId:00a9 | formId:00010 | paperId:000fff |

64

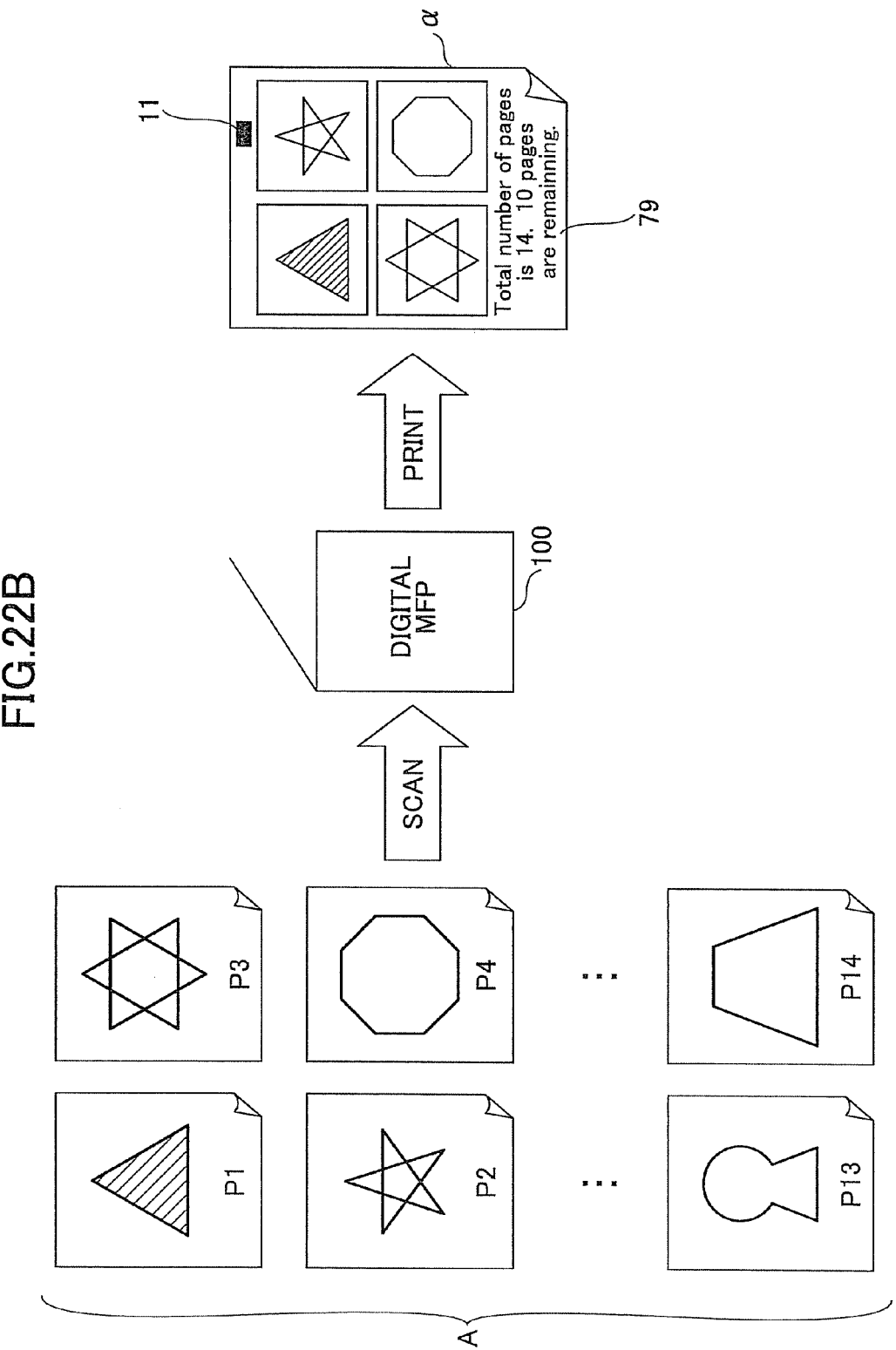

DOCUMENT MANAGING APPARATUS, DOCUMENT MANAGING SYSTEM, AND DOCUMENT MANAGING METHOD

BACKGROUND OF THE INVENTION

1. Field of the Invention

The present invention generally relates to a document managing apparatus for managing a correspondence relationship between image data of an input document and a printed document, and more specifically, a document managing apparatus, a document managing system and a document managing method, which are capable of identifying an input document based in a printed document.

2. Description of the Related Art

The more information systems and networks prevail, the more exchanges of information among companies and among departments in a company are conducted in a mode of sending and receiving electronic documents via networks. However, a mode of exchanging information with fax is still popular because of ease in handling paper media and a high penetration of telephone circuits and fax machines as the infrastructure. There is introduced an information entry system called an image workflow, which uses handling of the image data as digital data when a received fax is processed for acceptance or the like. Therefore, it becomes possible to efficiently confirm the content of an application with a received fax in a confirmatory operation. However, although image data may be displayed on a display in the image workflow, a reduced display is desired in displaying an ordinary fax image (a format size of A4 in 200 dpi) on an ordinary display because of limits of the size and the resolution of an ordinary display. Then, visibility becomes insufficient. Therefore, the image workflow does not sufficiently prevail.

For example, Patent Document 1 discloses a technique of easily associating electronic documents with paper documents in a workflow using both of the electronic documents and paper documents. Patent Document 1 discloses a business support system of storing document identification codes which enable a user to uniquely identify documents produced along with actions of the work flow, control information for controlling the document and document links for accessing the documents. Further, Document 1 discloses a business support system which attaches control information to the documents produced along with the workflow.

Further, Patent Document 2 discloses techniques by which, when an input image and a form image are synthesized and printed, the form image is encoded, the synthesized image having the encoded form image embedded in it is printed, the synthesized image formed by synthesizing the form image is scanned and the form image is restored, printed and registered. According to Patent Document 2, the convenience of printing using the form image is improved, and the capability of reusing the form image is also improved.

Patent Document 3 discloses a document processing apparatus for printing a form used in a workflow system using paper documents, handwriting characters or the like in the form, and scanning the form by a scanner. With this document processing apparatus, it is determined whether an entry area is filled in conformity with a form definition identified by an ID embedded in the form, and an output is obtainable in correspondence with the filled content in the entry area. Further, the document processing apparatus is capable of instructing to synthesize another form and a content written by hand, as one output mode.

The image workflows may have a problem that the capability of handling the image data is not sufficiently considered. For example, it is not possible to designate a part of a document even though access to every document is possible in the business support system disclosed in Patent Document 1. When only a part of the image data is necessary, it is not possible to extract only that part. Therefore, when the number of manuscripts is plural, it is unavoidable to print all of the image data in the manuscripts, and the consumption amount of papers becomes huge.

In the technique disclosed in Patent Document 2, since the data to be restored are encoded and embedded, it is unnecessary to prepare a system of managing the restoration data. Meanwhile, the size of the encoded and embedded area is determined, and all of the data to be restored are not always embedded. It is possible to print the written content into plural forms in the document managing apparatus disclosed in Patent Document 3. However, restoration of original data is not considered. Therefore, the convenience is spoiled when all of the image data become necessary.

Patent Document 1: Japanese Laid-Open Patent Publication No. 2007-200136

Patent Document 2: Japanese Laid-Open Patent Publication No. 2006-74439

Patent Document 3: Japanese Laid-Open Patent Publication No. 2008-293221

SUMMARY OF THE INVENTION

Accordingly, embodiments of the present invention may provide a novel and useful document managing apparatus, document managing system and document managing method solving one or more of the problems discussed above.

One aspect of the embodiments of the present invention may be to provide a document managing apparatus including an image data acquiring unit (e.g. fax receiving unit 51 and image receiving unit 55) configured to acquire original image data of original documents, a layout of the original documents in the original image data being defined, a layout information storing unit (e.g. form definition list 57) configured to store document IDs for uniquely identifying the original documents and layout information for determining the layout of the original documents, an original document determining unit (form definition managing unit 56) configured to determine the document IDs of the original documents by comparing the layout information with the layout in the original image data, a partial area information storing unit (form definition list 57) configured to store partial area information designating partial areas of the original image data respectively for the document IDs, a partial area extracting unit (e.g. form processing unit 52) configured to extract the partial areas of the original image data, designated by the partial area information, an arrangement information storing unit (e.g. input and output correspondence table 59) configured to store arrangement information on paper in association with the document IDs respectively for the partial areas, a synthetic image data generating unit (e.g. document generating unit 60) configured to form synthetic image data on which the partial areas are arranged in conformity with the arrangement information and form identification information which uniquely identifies the synthetic image data into the synthetic image data, a data accumulating unit (e.g. data accumulating unit 53) configured to cause a data storing unit (e.g. contents data database 54) to store the identification information in association with the original image data, and a printing unit configured to print a synthetic document on which the synthetic image data are formed.

Additional objects and advantages of the embodiments will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1A and FIG. 1B schematically illustrate an example of a document managing system.

FIG. 7 illustrates an example of a form definition list.

FIG. 9 illustrates an example of a form definition described in a form definition file.

FIG. 10 illustrates an example of an input and output correspondence table.

FIG. 11 illustrates an example of a form definition for synthetic image data.

FIG. 12A, FIG. 12B, FIG. 12C and FIG. 12D illustrate background information of several form definition files to be visually recognized.

FIG. 13 illustrates an example of a contents ID managing table.

FIG. 22A and FIG. 22B illustrate examples of relationships between an original document A and a synthetic document α.

DETAILED DESCRIPTION OF THE PREFERRED EMBODIMENTS

Figure 2:
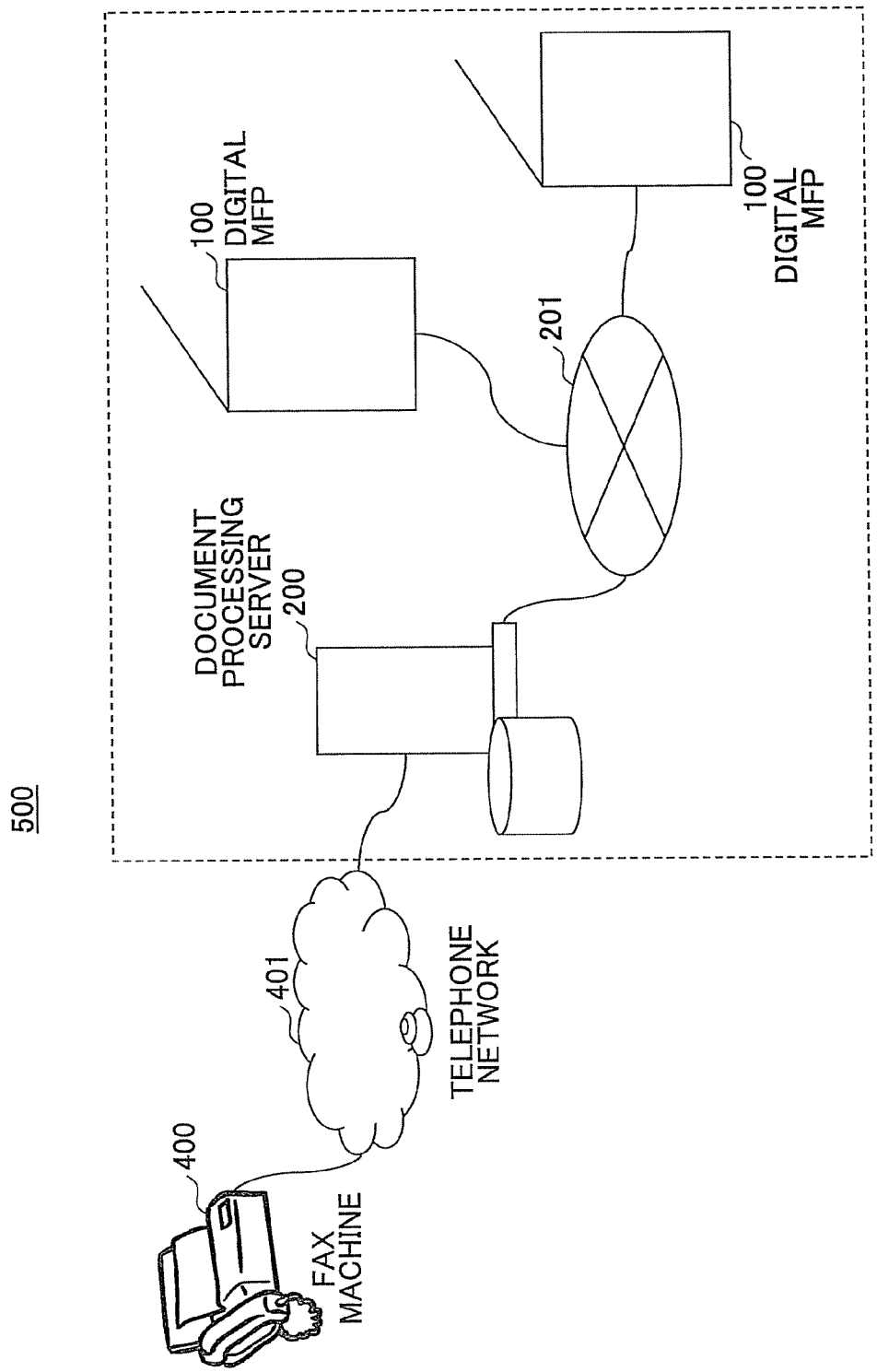
FIG. 2 illustrates a configuration example of a document managing system.

A description is given below, with reference to FIG. 1 through FIG. 23 of embodiments of the present invention.

Hereinafter, reference characters may typically designate as follows: 46: operating unit; 51: fax receiving unit; 52: form processing unit; 53: data accumulating unit; 54: contents data database; 55: image receiving unit; 56: form definition managing unit; 57: form definition list; 58: relevant form managing unit; 59: input and output correspondence table; 60: document generating unit; 61: image scanning unit; 62: image sending unit; 63: printing unit; 64: contents ID managing table; 100: digital multifunction peripheral (digital MFP); 200: document processing server; 201: network; 400: fax machine; 401: telephone network; 500: document managing system; DID: data ID; CD: contents data; CDID: contents data ID; CDID each: each contents data ID; EA: entry area; IA: insertion area; SI of EA: scan image of entry area; SI: scan image; all OII: all original image data; OII: original image data; SII: synthetic image data; SII including symbol: synthetic image data including a symbol; FID: form ID; input FID: input form ID; output FID: output form ID; AID: area ID; output PID: output paper ID; SDD: synthetic document data; instruction of generating SDD: instruction of generating synthetic document data; and FDF: form definition file.

FIG. 1A and FIG. 1B schematically illustrate an example of a document management system 500. FIG. 1A schematically illustrates a synthetic document printing mode of synthesizing an original document A (described below) and printing a synthetic document α. FIG. 1B schematically illustrates an original document printing mode of scanning the synthetic document α and printing the original document A.

The synthetic document printing mode illustrated in FIG. 1A is described. The original document A is, for example, a document (hereinafter, it may be referred to as "a form") having a predetermined layout such as a questionnaire for business use and a guarantee certificate. The original document A is a document or a group of documents used in a business operation. The number of the documents in the original document A is one or more. There is no upper limit to the number. Referring to FIG. 1A and FIG. 1B, the number of the group of the documents in the original document A is 3. The document managing system 500 previously defines positional information of entry areas a to d, which are to be extracted based on the layout of the original document A in advance.

When a digital multifunction peripheral (DIGITAL MFP) 100 acquires original image data as electronic data via a telephone network 401 or a network 201, the digital multifunction peripheral (DIGITAL MFP) 100 determines the layout of the original image data, and extracts the entry areas a to d from the original image data based on positions and sizes of the entry areas a to d, which are defined for the form. Specifically, copy data of the entry areas are acquired. The original image data are stored in a document processing server 200 (not illustrated) or the digital multifunction peripheral (DIGITAL MFP) 100.

The document managing system 500 previously defines positional information of the entry areas a to d of the original document A, in advance. The document managing system 500 identifies the original document A based on the layout. Then, the entry areas a to d are arranged in image data of a sheet of paper. The image data are referred to as "synthetic image data". A symbol 11, for example a bar code, is formed and arranged in the synthetic image data in order to be identified in a later stage.

The document managing system 500 prints the synthetic image data or sends these data to a personal computer (PC) of a user. Then, the document managing system 500 is capable of printing the synthetic image data to paper. Hereinafter, paper having the synthetic image data printed on it is referred to as "synthetic document α". Since only the entry areas a to d, desired by the user among the plural original image data, are synthesized, it is possible to limit the consumption amount of paper for printing, and handling of the paper media becomes easy.

Referring to FIG. 1B, the original document printing mode is described. When the digital multifunction peripheral 100 scans the synthetic document α having the synthetic image data printed on it, the digital multifunction peripheral 100 inversely transforms the symbol 11 and identifies the original document A. Then, the digital multifunction peripheral 100 reads the original image data of the original document A from the document processing server 200 or the digital multifunction peripheral 100. When there is any appended document related to the original image data, the appended document is also printed. The restored original documents β1 to β3 are the same as the original document A that has been scanned. For convenience of explanation, the restored document is referred to as "a restored original document". Hereinafter, restored original document β designates any one, a part, or all of the restored original documents β1 to β3.

As described, it is possible to restore the original document A including the entry areas a to d, which are arranged in the synthetic document α, by scanning the synthetic document α with a scanner. When it is difficult for a user to read the synthetic document α or when the user wishes to read all of the synthetic document α, the user can easily obtain the restored original documents β.

Embodiment 1

<System Configuration>

FIG. 2 illustrates an example of the configuration of a document managing system 500. The document managing system 500 includes a document processing server 200 connected to a telephone network 401, and one or more of digital multifunction peripherals 100 which are connected to the document processing server 200 via a network 201 such as a LAN or the Internet. As a preferred embodiment, a fax machine 400 may be connected to the telephone network 401. A user of the fax machine 400 may know the fax number of the document processing server 200. It is also possible to send or receive a fax via the network 201 instead of the telephone network 401.

There are several modes for the document processing server 200 to acquire the original image data. There are the mode of receiving the original image data from the fax machine 400, the mode that the digital multifunction peripheral 100 scans the original image data of the original document A and sends the original image data of the original document A to the document processing server 200, and the mode of sending the original image data from a personal computer (not illustrated).

The user utilizes the document processing server 200 by operating the digital multifunction peripheral 200. For example, the user may set printing of either the synthetic document α or the restored original document β on the digital multifunction peripheral 100. Hereinafter, an operation mode of printing the synthetic document α is referred to as a synthetic document printing mode, and an operation mode of printing the restored original document β is referred to as an original document printing mode.

When the document processing server 200 receives the original image data from the fax machine located outside in the synthetic document printing mode, the document processing server 200 generates the synthetic image data by synthesizing entry areas of the original image data and sends the synthetic image data to the digital multifunction peripheral (DIGITAL MFP) designated by the user. The digital multifunction peripheral (DIGITAL MFP) 100 prints the synthetic image data on paper. Thus, the user may obtain the synthetic document α.

Next, when the document processing server 200 scans a paper document set by a user on a feeder of the digital multifunction peripheral (DIGITAL MFP) 100 in the synthetic document printing mode, the original image data are received from the digital multifunction peripheral (DIGITAL MFP) 100 in a manner similar to the above case where the fax machine 400 is used. The document processing server 200 generates the synthetic image data from the original image data obtained by scanning the paper document and sends the scanned data to the digital multifunction peripheral 100 designated by the user. The digital multifunction peripheral (DIGITAL MFP) 100 prints the synthetic image data on paper. Thus, the user may obtain the synthetic document α.

Next, when a user sets the synthetic document α on the feeder of the digital multifunction peripheral (DIGITAL MFP) 100 and the synthetic document α is scanned in the original document printing mode, the document processing server 200 receives the synthetic image data of the synthetic document α. The document processing server 200 reads the original image data, from which the entry areas are extracted, from a hard disk drive (HDD), and sends the original image data to the digital multifunction peripheral 100 designated by the user. The digital multifunction peripheral 100 prints the synthetic image data on paper. Thus, the user may acquire restored original document β1 to β3.

<Hardware Configuration>

Figure 3:
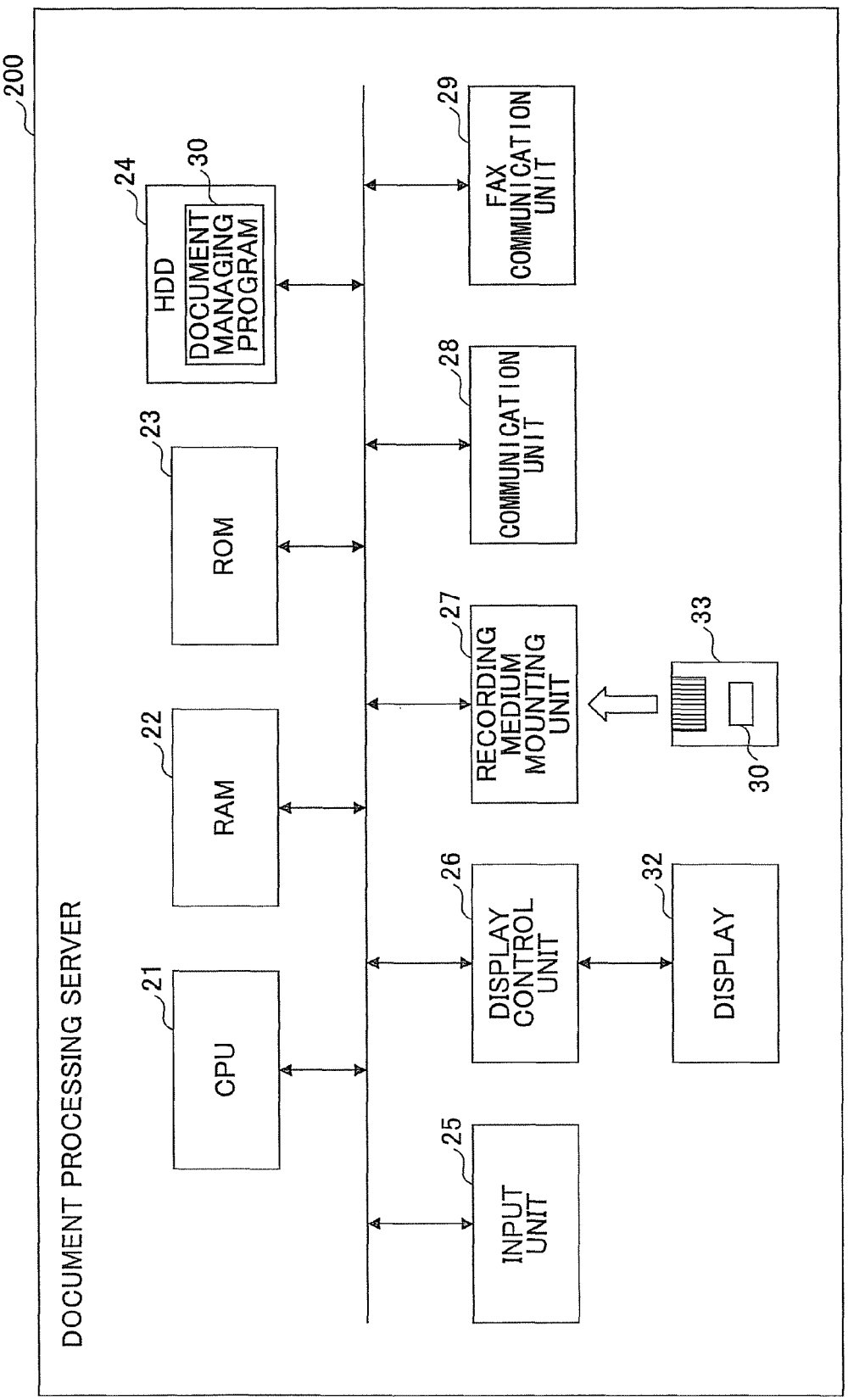
FIG. 3 illustrates a hardware configuration example of a document processing server.

FIG. 3 illustrates an example of a hardware configuration of the document processing server 200. The document processing server 200 includes a computer including a CPU 21, a RAM 22, a ROM 23, a HDD, an input unit 25, a display controlling unit 26, a recording medium mounting unit 27 and a communication unit 28, mutually connected by a bus.

The CPU 21 totally controls the document processing server 200 by reading a document managing program 30 from the HDD 24 and executing a code described in the read document managing program 3. The RAM 22 is a working area used by the CPU 21 in executing the document managing program 30. The RAM 22 may be a volatile memory such as a DRAM. The ROM 23 stores a Basic Input/Output System (BIOS), and a device driver enabling minimally accessing to hardware such as a mouse and a keyboard. By calling a bootloader from the BIOS, it is possible to start up an operating system (OS). The HDD 24 stores files such as the document managing program 30, the OS and a form definition file described later. Instead of the HDD 24, a Solid State Drive (SSD) may be used.

The input unit 25 may be a mouse, a keyboard or the like, enabling an administrator to input instructions of operating the document processing server 200. The display controlling unit 26 is connected to a display 32. The display controlling unit 26 receives a request for drawing using an Application Program Interface (API) from the document managing program 30 and the OS, and displays a Graphical User Interface (GUI) screen having a predetermined resolution or graphic mode and a predetermined number of colors on the display 32. The recording medium mounting unit 27 is configured so that an optical disk medium such as a CD-ROM and a DVD-ROM and a memory card 33 such as a flash memory are detachable. The recording medium mounting unit 27 is used when the data are read from the memory card 33, and the data are written in the memory card 33. The document managing program 30 is stored in the memory card 33, and distributed.

When installed on the HDD 24, the document managing program 30 is read from the memory card 33. The document managing program 30 may be downloaded into the document processing server 200 from a server (not illustrated) connected to the network 201.

The communication unit 28 is an interface for connecting to the network 201 such as a LAN or the Internet. For example, the communication unit 28 includes an Ethernet card (ETHERNET (upper case) is a registered trademark). The communication unit 28 receives data generated in conformity with HTTP, FTP or the like by a predetermined application program (for example, a program executed by the digital multifunction peripheral). The communication unit 28 processes transmission data in conformity with a protocol stipulated in the physical layer and the data link layer of the OSI reference model, and sends the processed transmission data to the network 201. When the router installed in the network 201 handles the routing of the transmission data in conformity with TCP/IP, the transmission data are sent to the digital multifunction peripheral 100. A fax communication unit 29 compresses image data with the MH, MR or MMR coding and modulates the compressed image data in conformity with a G3 type facsimile recommended by ITU-T (ITU telecommunication standardization sector) or the like. Then, the fax communication unit 29 sends the modulated image data via, for example, a telephone network 401 or an ISDN line. When the sent image data are received on a receiving side, the sent image data undertake data decompression, error correction or the like on the receiving side to restore the image data.

Figure 4:
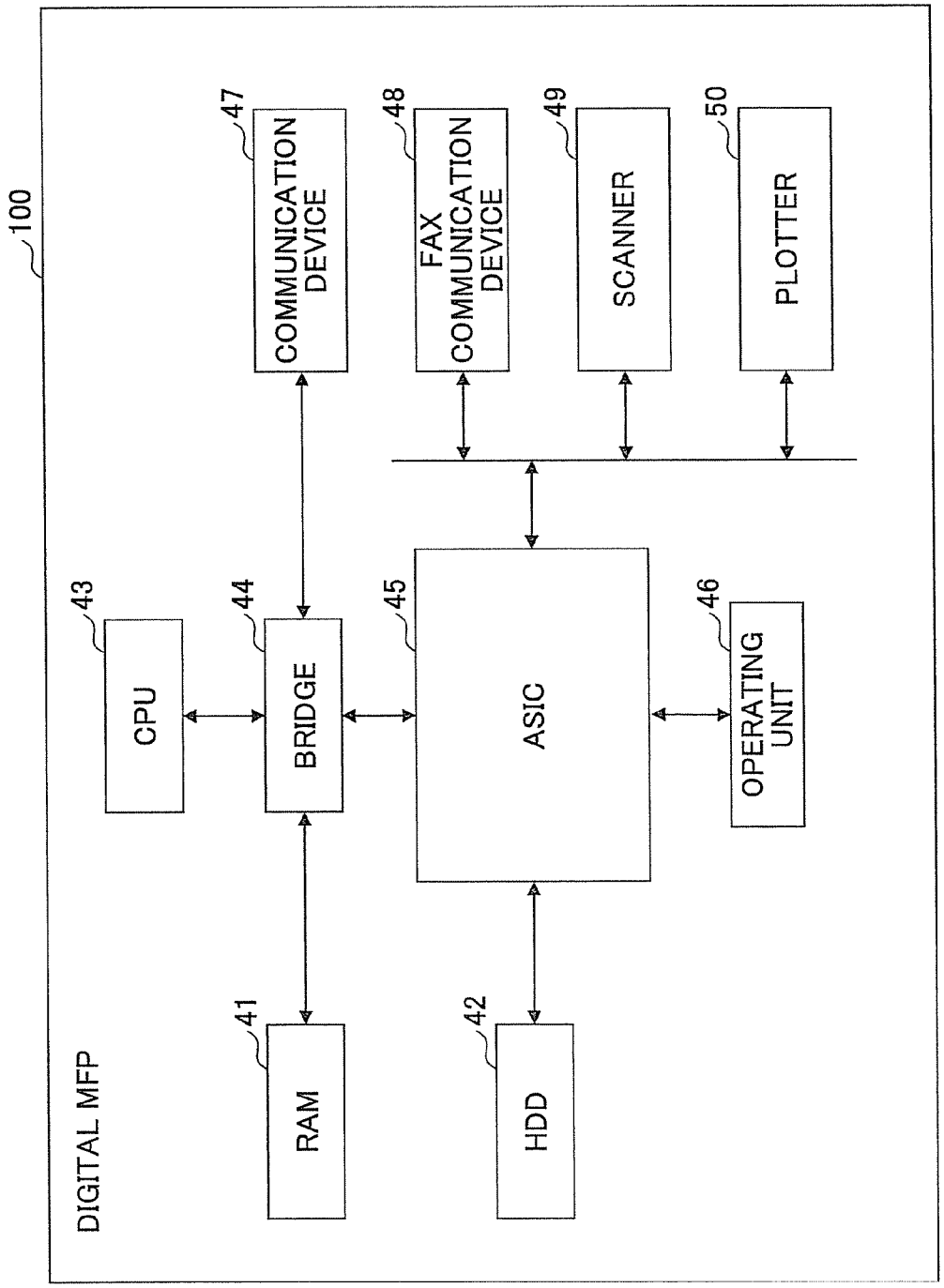
FIG. 4 illustrates a hardware configuration example of a digital multifunction peripheral (MFP).

FIG. 4 illustrates an example of a hardware configuration of the digital multifunction peripheral 100. The digital multifunction peripheral 100 has a configuration such that a CPU 43 and an Application Specific Integrated Circuit (ASIC) 45 providing functions of the digital multifunction peripheral 100 such as copying are connected by a bridge 44. The ASIC 45 includes many registers and logic circuits, and functions to control a driver of a feed motor for feeding papers, or functions as a head pulse generating unit or otherwise. A RAM 41 is a working memory used by the digital multifunction peripheral 100 itself in forming an image or used as a copy image buffer or an encoding buffer.

The HDD 42 is s storage unit configured to store image data, programs, font data, forms or the like. Instead of the HDD 42, an SSD may be installed. An operating unit 46 is a user interface which receives an input operation from a user and displays menus or states for the user. The operating unit 46 may be integrally formed with a touch panel. The operating unit 46 has a keyboard including numeric pads, a start button, a reset button, a copy button, a scanner button and a fax button. The communication unit 47 is an interface for connecting the digital multifunction peripheral 100 to the network 201 such as the LAN or the Internet in a manner similar to the communication unit 28 of the document processing server 200.

The fax communication unit 48 is capable of sending and receiving the image data via the telephone network 401 in a manner similar to the fax communication unit 29 of the document processing server 200. A scanner 49 optically scans a manuscript mounted on a contact glass, applies A/D transformation to a reflected light from the manuscript, and applies image processing such as an error diffusion and a gamma transformation to the A/D transformed image data. Thus, the image data having a predetermined resolution or graphic mode is generated. For example, an electrophotographic process using laser beams is used. Specifically, a toner image formed on a photoconductive drum is transferred to the paper, and the transferred image is fixed by heat and pressure by a fixing unit.

The digital multifunction peripheral 100 may not have all functions of the plotter 50, the scanner 49 and the fax communication unit 29. In use of the digital multifunction peripheral 100 having the scanner 49, the document processing server 200 may generate synthetic image data of the synthetic document α. Once the synthetic image data are generated, it is possible to print the synthetic image data with a printer other than the digital multifunction peripheral which has scanned the original image data.

<Functional Block of the Document Managing System 500>

Figure 5:
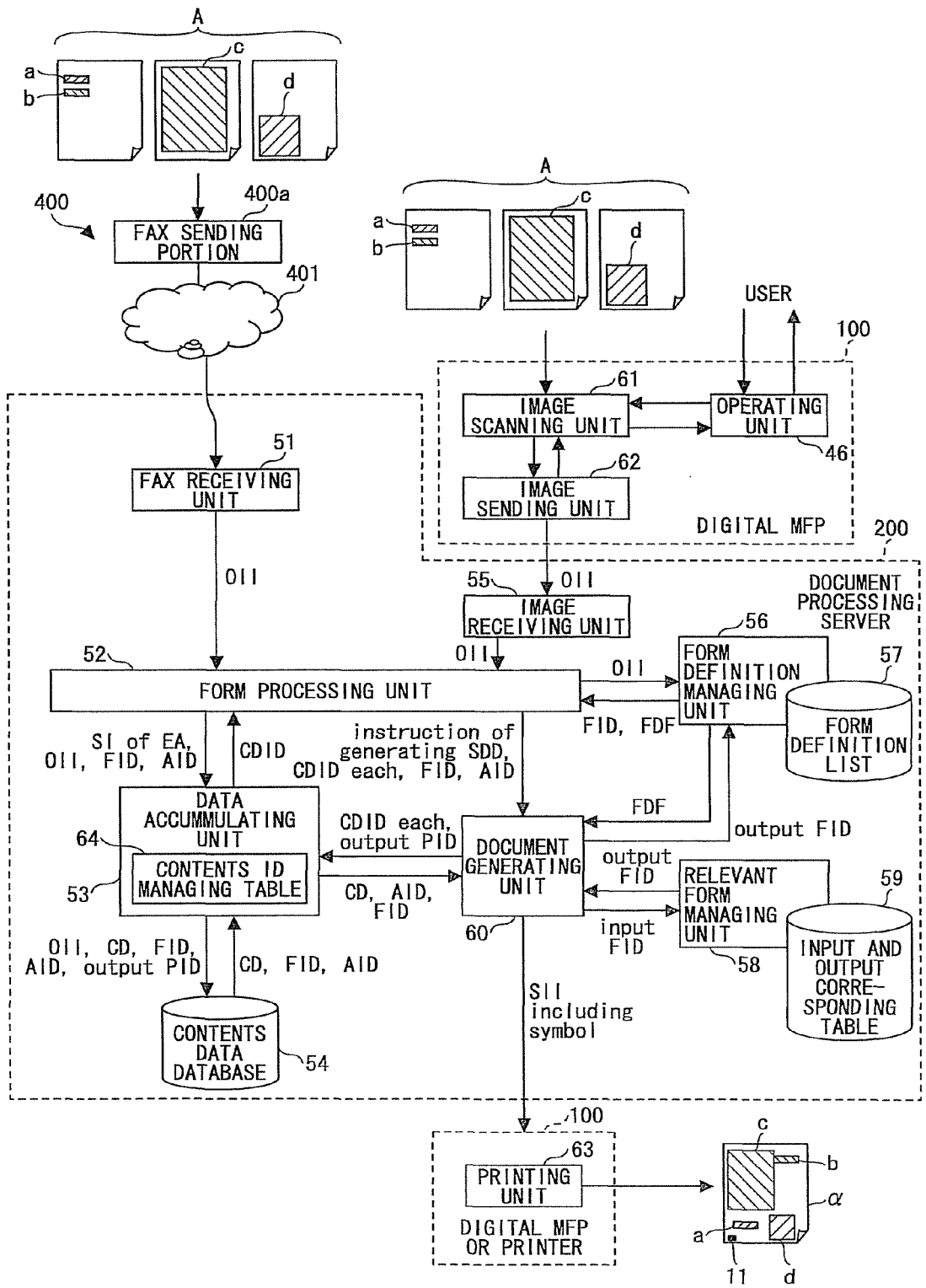
FIG. 5 illustrates an example of a functional block chart of the document managing system.

FIG. 5 illustrates an example of a functional block of the document managing system 500. Various functions of the document processing server 200 are realized when the CPU 21 executes a document managing program 30 stored in a HOD 24 and when predetermined hardware operates. The original image data of the original document A are sent to the document processing server 200 from a fax sending portion 400*a* or an image scanning unit 61 of the digital multifunction peripheral (DIGITAL MFP) 100. The document processing server 200 generates the synthetic image data, and send these data to the digital multifunction peripheral (DIGITAL MFP) 100. The digital multifunction peripheral (DIGITAL MFP) 100 outputs the synthetic document α by printing the synthetic image data.

<Digital Multifunction Peripheral 100>

The functional block of the digital multifunction peripheral 100 is described below. The order of explanations does not always match an actual process.

The operating unit 46 of the digital multifunction peripheral (DIGITAL MFP) 100 is used by a user in order to input various operations as described above. In Embodiment 1, the operating unit 46 specifically provides a selection key 71 for a user of selecting the synthetic document printing mode and the original document printing mode.

Figure 6:
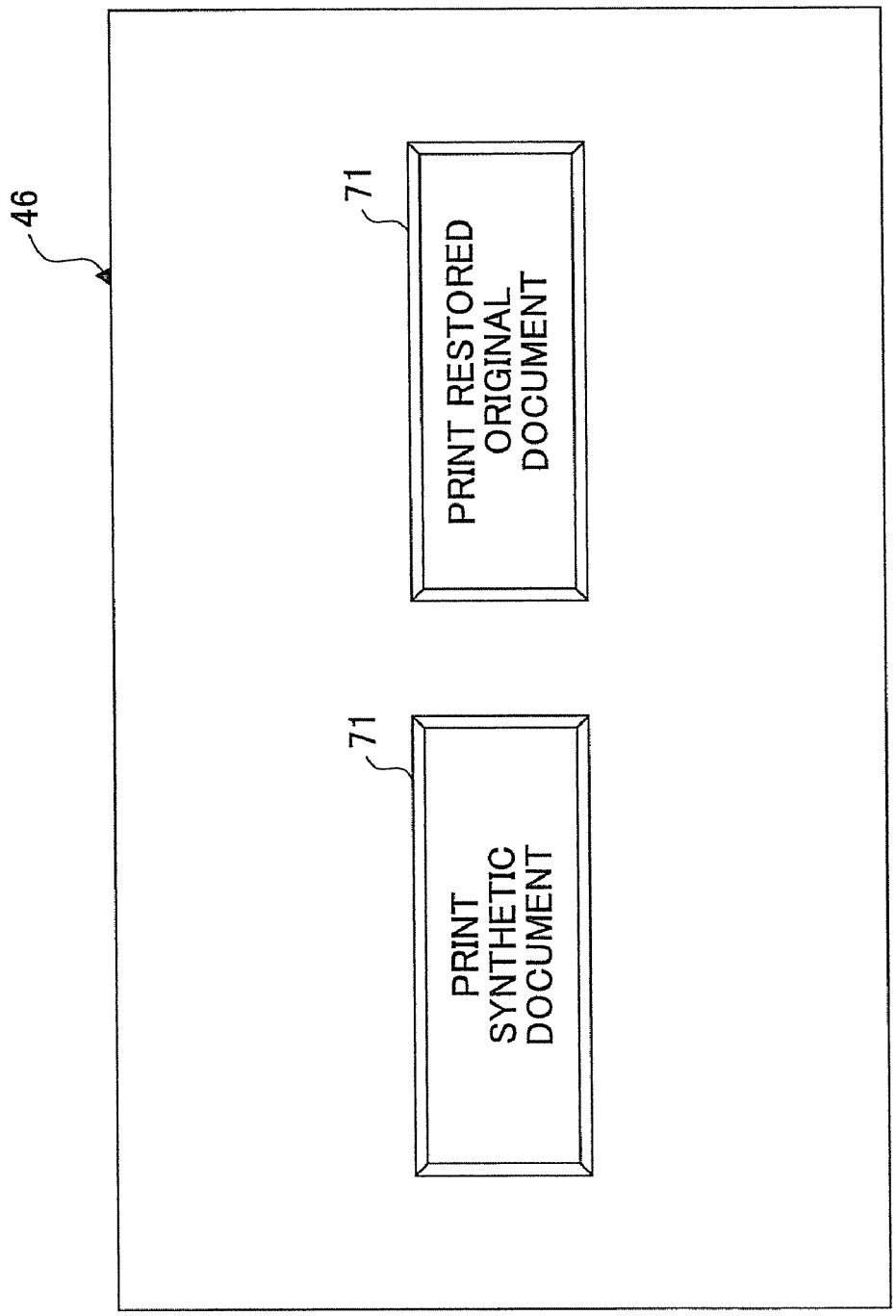
FIG. 6 illustrates an example of selection keys displayed on a touch panel of an operating unit.

FIG. 6 illustrates an example of selection keys 71 displayed on a touch panel of the operating unit 46. The selection keys 71 are displayed when the user operates the digital multifunction peripheral 100 with a predetermined method. When the user touches "PRINT SYNTHETIC DOCUMENT", the digital multifunction peripheral 100 changes to the synthetic document printing mode. When the user touches "PRINT ORIGINAL DOCUMENT", the digital multifunction peripheral 100 changes to the original document printing mode. The digital multifunction peripheral 100 detects in the synthetic document printing mode that the original document A set up on the feeder is an object to be printed. The operating unit 46 displays whether the image scanning reported from the image scanning unit 61 is successfully completed.

In the synthetic document printing mode, the image scanning unit 61 causes a scanner 49 to scan the original document A set on the feeder of the scanner 49, generates the original image data and sends the data to an image sending unit 62. Therefore, a main component of the image scanning unit 61 is the scanner 49. In the synthetic document printing mode, the digital multifunction peripheral (DIGITAL MFP) 100 does not print the scanned image data as is with the plotter. The image scanning unit 61 receives a report of whether the original document is successfully sent to the document processing server 200 from the image sending unit 62. When the image scanning unit 61 fails to scan the original document A or receives a report of unsuccessfully sending the original document, the image scanning unit 61 reports the operating unit 46 that the image is unsuccessfully scanned or read.

The image sending unit 62 sends the original image data received from the image scanning unit 61 to the document processing server 200 via the network 201. Therefore, the image sending unit 61 is mainly configured by the communication unit 28. When the image sending unit 62 unsuccessfully sends the original image, the event is reported to the image scanning unit 61.

<Document Processing Server 200: Generation of Synthetic Document>

The document processing server 200 undertakes two major functions. One is a synthetic document generating function, and the other is an original image data reading function. When the digital multifunction peripheral 100 sends the image data in the synthetic document printing mode or the fax receiving unit 51 receives the original data, the synthetic document generating function is provided. When the digital multifunction peripheral 100 sends the image data in the restored original document printing mode, the original image data reading function is provided. Therefore, the operation mode of the digital multifunction peripheral (DIGITAL MFP) 100 is send to the document processing server 200 together with the image data.

FIG. 5 illustrates the function related to the synthetic document generating function.

<Fax Receiving Unit 51 and Image Receiving Unit 55>

The document processing server 200 may receive the original image data by fax (first case) or from the digital multifunction peripheral (DIGITAL MFP) 100 (second case). The fax receiving unit 51 receives the original image data sent from a telephone circuit or the like, and sends the received original image data to a form processing unit 52. Therefore, the fax receiving unit 51 is mainly configured by a fax communication unit 29. The fax receiving unit 51 may detect that the original image data are used to generate the synthetic image data in a case where the original image data are sent to a predetermined fax number. The fax receiving unit 51 may detect that the original image data are used to generate the synthetic image data in a case where the user pushes a predetermined number or a pound (#) key, allocated to inform sending of the original image data, before and after the fax transmission. The fax receiving unit 51 sends the received image data to the form processing unit 52.

Further, the image receiving unit 55 sends the original image data sent from the digital multifunction peripheral (DIGITAL MFP) 100 via the network 201, and sends the received original data to the form processing unit 52. Therefore, the image sending unit 55 is mainly configured by the communication unit 28.

<Form Definition Managing Unit 56>

The form definition managing unit 56 manages a unique form ID (identifier) allocated to every form, an image dictionary for identifying images of the original image data of the forms and a form definition file used for processing the forms in a manner associating the unique form ID, the image dictionary and the form definition file. Hereinafter, the associated list is referred to as a form definition list 57. When the form definition managing unit 56 receives the original image data from the form processing unit 52, the form ID (identifier) and the form definition file are returned to the form processing unit 52. Here, a location of the form definition file may be returned instead of the form definition file itself.

FIG. 7 illustrates an example of the form definition list 57. The image dictionary or the location of the image dictionary and the location of the form definition file (or the form definition file) are registered in association with the form ID. Form definition is described in the form definition file for generating the synthetic image data.

The form definition managing unit 56 judges an original document A using measures such as a pattern matching. Then, the form ID of the image data of the original document A received from the form processing unit 52 is determined.

Figure 8A:
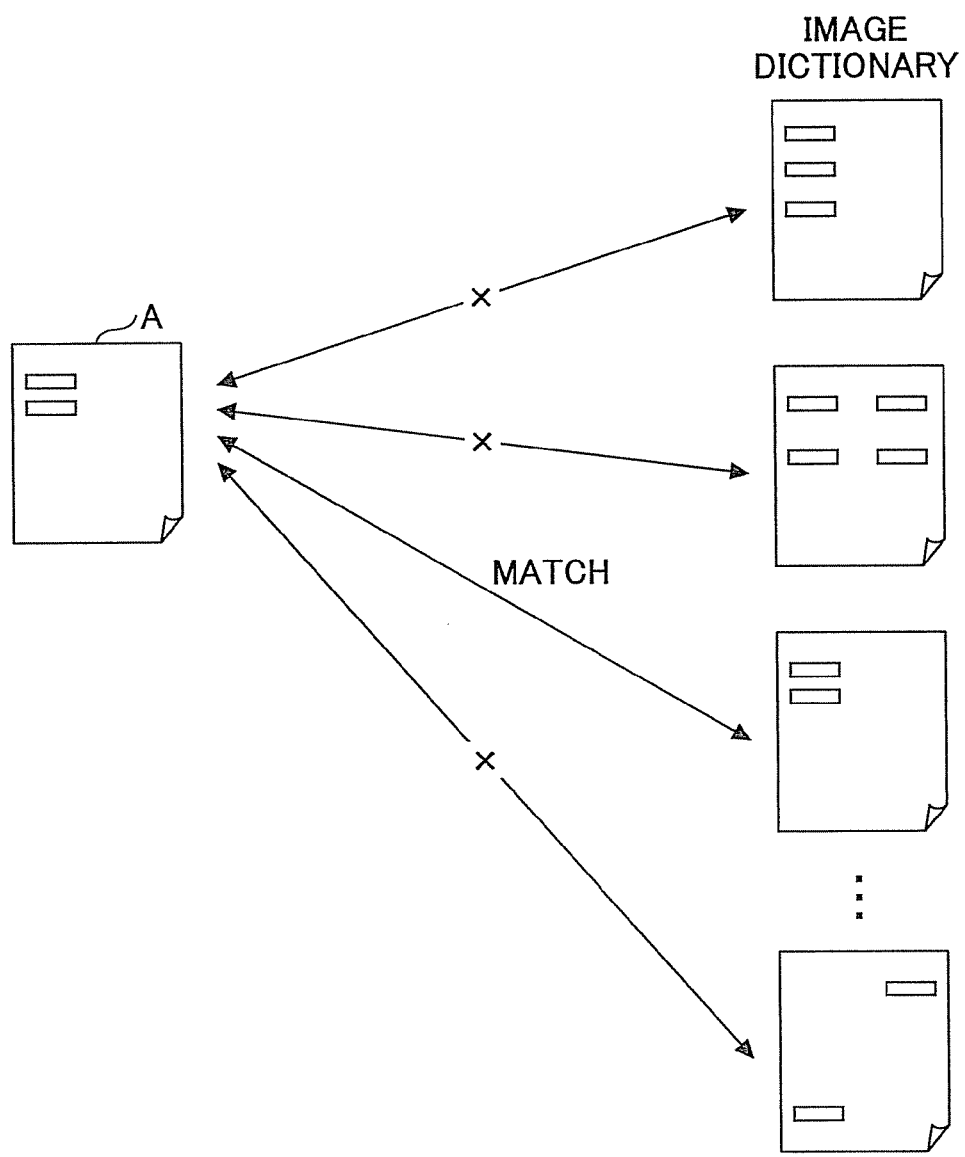
FIG. 8A and FIG. 8B schematically illustrate an example of how to determinate an original document.

FIG. 8A schematically illustrates the determination of the original document A. Layout information of the original document previously registered is stored in the image dictionary. The image dictionary of FIG. 8A is formed so that layouts in the image dictionary are distinguishable with the naked eye. However, a format of storing the image dictionary may use a coordinate or a function of a feature point. The form definition managing unit 56 digitizes the original image data and compares the original image data with various layout information pieces of the image dictionary. The form definition managing unit 56 determines whether pixel values of the original image data match while changing pixels of the original image data one by one. Then, which one of the layout information pieces match the most is determined under a criteria that a degree of matching the pixel values is a predetermined value or more.

When the original document A is configured by plural pages, it is possible to determine the original document A with only the first page (e.g. a book cover or an indispensable page), or the original document A. Meanwhile, it is possible to determine the original document A by matching patterns of the image data of all the pages A.

Figure 8B:
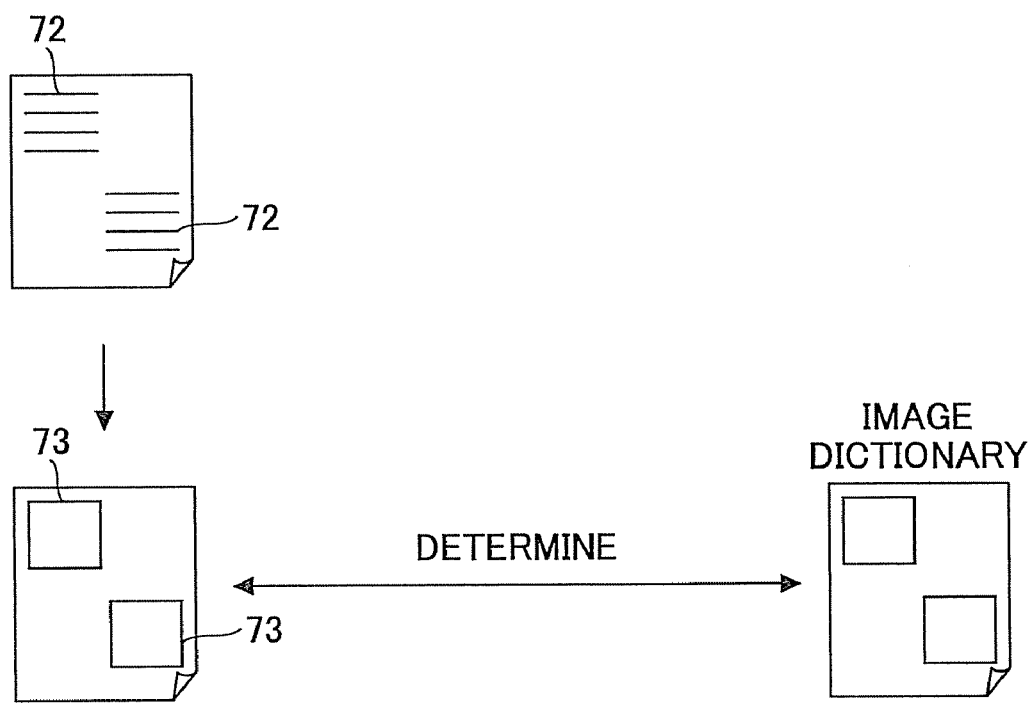

It is not always necessary to provide frame borders on the layout of the original document A. FIG. 8B schematically illustrates the determination of the original document A having no frame border. Referring to FIG. 8B, texts 72 are described on the original document A. However, there is no frame border surrounding the texts. In this case, the form definition managing unit 56 recognizes the circumscribed rectangles of the texts 72, and the texts 72 are replaced by the circumscribed rectangles. Then, the form definition managing unit 56 compares the original image data in the circumscribed rectangles with layout information of the image dictionary. Since the frame borders are unnecessary, a degree of freedom may become higher in the layout of the original document A.

It is possible to print a one-dimensional bar-code or a two-dimensional bar-code which was previously present on the original document A. In this case, the read bar code is decoded and the original document A may be determined without conducting the above-described pattern matching.

Referring back to FIG. 5, the form definition managing unit 56 acquires the output form ID (described later) from a document generating unit 60. The form definition file associated to the output form ID or the form definition file location is read from a form definition list 57. Then, the read form definition file or the read form definition file location is returned to the document generating unit 60.

The form processing unit 52 is described below. The form processing unit 52 acquires the form ID and the form definition file corresponding to original image data sent from the fax receiving unit 51 or the image receiving unit 55 from the form definition managing unit 56. When the form definition managing unit 56 is not capable of determining the original document A, or the original document A is not registered in the form definition list 57, the form definition managing unit 56 reports the event to the form processing unit 52.

When the original image data are already registered, the form processing unit 52 processes the original image data in conformity with the form definition described in the form definition file. FIG. 9 illustrates an example of the form definition described in the form definition file (FDF). FIG. 9 illustrates the form definition described using tags. The name of the form is defined from <FORM_NAME='Incident/Accident Report'> to </FORM>. <DESIGN FILE NAME='c:¥form¥form1.pdf'/> designates the file name of the form as an example of a layout defined by the form definition file and a location where the file are stored. Entry areas of the first page of the form are defined in <PAGE PAGE NO.='1'> to </PAGE>. When the original document includes plural pages, and the entry areas are read from the pages, the first page and the succeeding pages are defined in a manner similar thereto.

The user may write in the entry areas on the forms. The entry areas may be a partial area in which the user does not write a character or a number, or an area in which a character or a number is mechanically printed by a printer connected to or integrated in a word processor or the like.

The position, size, processing method or the like is defined in <EA AID='rid:0001' NAME='FULL NAME' LATERAL POSITION='167' LONGITUDINAL POSITION='164' HEIGHT='25' PROCESSING METHOD-'IMAGE STORAGE' COMPULSORY ENTRY='TRUE'/>. For example, the area ID uniquely identifying the entry area is "rid:0001". The name of the entry area is "FULL NAME", in which a full name of a person who has made the entry of the form is described. The position of the entry area is, for example, coordinates (167, 164) from the origin at the upper left apex of the image data. The size of the entry area is a width of 130 and a height of 25 from the coordinates (167, 164). Further, the processing method is defined as "image storage". The compulsory input is defined as "true", said differently, the entry is mandatory. Such processing of the areas is defined for each of the entry areas.

In the form definition file, an area which is not processed is defined in <ADDITIONAL MANAGEMENT ITEM> thru </ADDITIONAL MANAGEMENT ITEM>. When necessary, it is possible to define the position, size or processing method of the entry area for this area.

The form processing unit 52 determines processing of the entry area (EA) based on the described content of the processing method. When the processing method is "image storage", the entry area is copied and stored (or is extracted). The read image of the entry area (EA) extracted from the image data becomes content data described later. When the processing method performs "recognizing check", it is determined whether the entry area (EA) has any entry or a check mark. When the processing method performs "recognizing character", the entry area (EA) is applied with Optical Character Recognition (OCR) to transform a written character or symbol to a character code.

The form processing unit 52 carries out processes in conformity with description of the form definition file (FDF), and sends a scanned image of the entry area (EA), the original image data, the form ID (FID) and the area ID (AID) to the data accumulating unit 53. The data accumulating unit 53 handles the scanned images of the entry area (SI of EA) as the contents data as described later, and gives the contents data ID (CDID) for uniquely identifying the contents data (CD) to the scanned images (SI). The form processing unit 52 receives a content data ID (CDID) from the data accumulating unit 53.

After the form processing unit 52 receives the contents data ID (CDID), the form processing unit 52 sends the document generating unit 10 an instruction of generating the synthetic document data, the contents data IDs (CDID), the form ID (FID) and area ID (AID) of the original document A determined from the original image data.
<Relevant Form Managing Unit 58>

The relevant form managing unit 58 manages an input form ID (input FID) and an output form ID (output FID) while associating the input form ID (input FID) and the output form ID (output FID). The input form ID (input FID) is the same as the form ID (FID). The output form ID (output FID) is an identifier of the form definition file (FDF) which designates the layout of the synthetic document α. Said differently, the form definition file (FDF) designates the layout of the synthetic document α. The input form ID (input FID) and the output form ID (output FID) are registered in the relevant form managing unit 58 after the input form ID (input FID) and the output form ID (output FID) are associated by the administrator of the document managing system 500.

FIG. 10 illustrates an example of an input and output correspondence table 59. The input and output correspondence table 59 associates the input form ID (input FID) with the output form ID (output FID). When the form ID (FID) of the original image data received from the form processing unit 52 is "formId:0001", where "formId:0001" is the output form ID (output FID) of the form definition file (FDF) which defines the layout of the synthetic document α printed by "formId: 0001". The relevant form managing unit 58 receives the input form ID (input FID) from the document generating unit 60, refers to the input and output correspondence table 59, and returns the output form ID (output FID) associated with the input form ID (input FID).

When the document generating unit 60 receives the instruction of generating the synthetic document data (SDD) and the contents data IDs (CDID) from the form processing unit 52, the form ID (FID) or the input form ID (input FID) is sent to the relevant form managing unit 58. Then, the output form ID (output FID) of the form definition file (FDF) defining the layout of the synthetic document α to be printed is acquired.

The document generating unit 60 sends the acquired output form ID (output FID) to the form definition managing unit 56, and acquires the form definition file (FDF) of the synthetic image data. The document generating unit 60 may maintain the form definition file (FDF). FIG. 11 illustrates an example of a form definition for the synthetic image data.

The name "Incident/Accident Report" of the synthetic document α is defined from <FORM NAME='Incident/Accident Report'> to </FORM>. Background information used at a time of generating the synthetic image data (SII) is defined in <DESIGN FILE NAME='c:¥form¥form1.pdf'/>. Insertion areas (IA) of the first page of the form are defined in <PAGE PAGE NO.='1'> to </PAGE>. The position and size of the synthetic image data (SII), and area ID (AID) of an entry area (EA) to be inserted are defined in <IA NAME='INSERTION IMAGE 1' LATERAL POSITION='40' LONGITUDINAL POSITION-'260' WIDTH-'80' HEIGHT='20' BACKGROUND='{formId: 00001/rId:0001}'/>. For example, the process of synthesizing the contents data having the form ID (FID) of "formId: 00001" and the area ID (AID) of "rId:0001" is defined in an area having the width of 80 and the height of 20 from the coordinates (40, 260). Referring to FIG. 11, the insertion positions and sizes of the entry areas (EA) are defined.

Figures 12A, 12B:
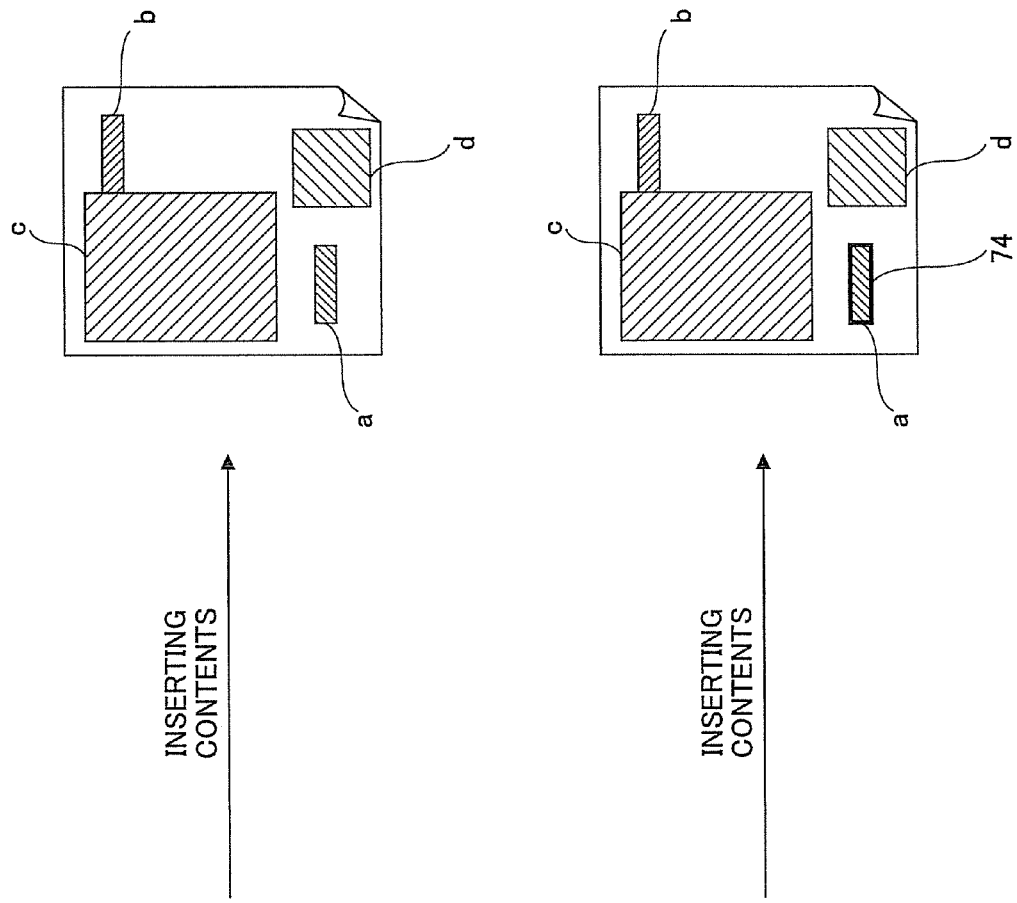

The background information of a design file "form1.pdf" in the form definition file is described below. Design files such as the design file "form1.pdf" correspond to or are included in designing image data recited in claims. FIG. 12A, FIG. 12B, FIG. 12C and FIG. 12D illustrate background information of several form definition files (FDF). FIG. 12A is the most simple background information. The background of FIG. 12A is white, and the contents data (CD) are inserted into the background.

For example, there is a case where predetermined contents data are emphasized and output to the synthetic documents. In this case as illustrated in FIG. 12B, it is possible to designate the background having a highlighted frame 74 as the design file. Referring to FIG. 12B, the highlighted frame 74 is depicted at lower left of the background information. By determining the highlighted frame 74 to surround the insertion area (IA), it is possible to arrange the contents data (CD) to be emphasized in the highlighted frame 74. The highlighted frame 74 may be colored. For example, the color is red in FIG. 12B and other colors may also be used.

In a case where the user makes entries by hand in the entry areas (EA) of the form being original document A, the user may fail to make one or some entries by mistake or forgetting. There may be both of a compulsory entry area like a name and a noncompulsory entry area like sex and age. If it is possible for the user to determine whether the entry areas (EA) are the compulsory entry area of the noncompulsory entry area and what contents are planned to be inserted, the convenience of the document managing system 500 may be improved.

Referring to FIG. 12C, there are described, in the background, messages 75 indicating whether the contents data (CD) are planned to be compulsorily inserted. As a result of the insertion, the contents data corresponding to the entry areas B, C and D are inserted. However, the contents data corresponding to the entry area A are not inserted. Therefore, the user may read the message 75 indicating "COMPULSORY INSERTION" described, in the background. Therefore, the user may immediately determine that the compulsory insertion of the contents is not carried out.

When a blank entry area is inserted as empty contents data colored white, the message 75 on the background is replaced by white pixels and may not be scanned. Therefore, contents data with semitransparent displays are inserted by the document generating unit 60, for example. It may also be determined whether the entry area has an entry based on a ratio of black pixels occupying the entry area. When it is determined that the entry does not exist, the contents data are not inserted.

Referring to FIG. 12D, there are described, in the background, messages 76 indicating the content of the contents data. Therefore, the user may determine what contents are not inserted.

Referring back to FIG. 5, the document generating unit 60 reports the contents data ID (CDID) to the data accumulating unit 53 when there is a combination of the form ID (FID) and the area ID (AID), designated in the form definition file (FDF) of the synthetic image data (SII) among the area IDs (AID) and the form IDs (FID) corresponding to the contents data ID (CDID), received from the form processing unit 52. The document generating unit 60 acquires the contents data (CD) corresponding to the contents data IDs (CDID) and the contents data location from the data accumulating unit 53.

The document generating unit 60 synthesizes the contents data (CD) to appear at a position designated by the form definition file (FDF) of the synthetic image data (SII). When the contents data (CD) corresponding to all the contents data IDs (CDID) received from the form processing unit 52 are inserted, the synthetic image data (SII) are completely generated.

There is a case where the size of the contents data (CD) and the size of the area where the contents data are inserted are different when the document generating unit 60 inserts the contents data. Therefore, the document generating unit 60 compares the size of the contents data (CD) and the size of the area where the contents data are inserted. When the size of the contents data (CD) is larger that the size of the area, the contents data are reduced. The reduction may be conducted by thinning out pixels of the contents data (CD) in response to a ratio between the size of the contents data and the size of the insertion area (IA). Further, when the size of the contents data (CD) is smaller than the size of the area where the contents data are inserted, the contents data may be enlarged in response to the ratio between the size of the contents data (CD) and the size of the insertion area (IA).

The document generating unit 60 generates an output paper ID (output PID) for uniquely identifying the synthetic image data (SII), transforms the output paper ID (output PID) into a symbol 11 which is readable by a machine like a QR code, and forms the synthetic image data (SII) by arranging the symbol 11 at a predetermined position of the synthetic image data. The document generating unit 60 sends the contents data ID (CDID) used for the generated output paper ID (output PID) and the synthetic image data to the data accumulating unit 53. The document generating unit 60 sends the generated synthetic image data (SII) to the digital multifunction peripheral (DIGITAL MFP) 100. It is possible to form a symbol 11 like a background pattern on an entire face of synthetic image data (SII) instead of forming a symbol 11 like a bar code on a part of the synthetic image data. It is also possible to form a symbol 11 like a digital watermark and a micro character which are difficult to perceive with the naked eye.

<Data Accumulating Unit>

The data accumulating unit 53 manages the contents data (CD) and information related to the contents data such as the form ID (FID) of the original image data (OII) of the original document A, the area ID (AID) and the output paper ID (output PID). FIG. 13 illustrates an example of a contents ID managing table 64. The contents ID managing table 64 is managed by the data accumulating unit 53. The contents data location where the contents data are stored, an original data location, the area ID (AID), the input form ID (input FID) and the output paper ID (output PID) are stored in contents data IDs (CDID).

The data accumulating unit 53 generates the contents data ID for uniquely identifying the contents data when the data accumulating unit 53 receives the contents data send out of the form processing unit 52, the area ID (AID) of the contents data (CD), the original image data (OII) of the contents data (CD) and the form ID (FID) of the original image data. Then, the data accumulating unit 53 stores the contents data ID (CDID), the contents data, the area ID (AID), the original image data (OII) and the form ID (FID) in the contents data database 54, and returns the generated contents data ID to the form processing unit 52.

The original data location is unique to the same original image data. Therefore, when plural contents data are extracted from predetermined original image data, the same information is stored in the corresponding original image data location. The original data location also stores the area ID (AID) indicative of which entry area (EA) of the original document A, the input form ID (input FID) acquired by identifying the original image data (OII) and the output paper ID (output PID) for identifying the synthetic image data (SII) generated by synthesizing the contents data.

When the data accumulating unit 53 receives the contents data ID (CDID) and the output paper ID (output PID) from the document generating unit 60, the data accumulating unit 53 stores the received output paper ID in a column of the output paper ID and a row corresponding to the contents data ID of FIG. 13.

<Printing Unit 63>

Referring back to FIG. 5, the printing unit 63 prints the synthetic image data (SII) received from the document processing server 200 on paper. Therefore, the printing unit 63 is mainly configured by the plotter 50. The format of the synthetic image data (SII) may be a pdf file, printer job languages like PostScript, raster data or the like.

Referring to FIG. 5, the digital multifunction peripheral (DIGITAL MFP) 100 which scans the original document A is different from the digital multifunction peripheral (DIGITAL MFP) 100 which prints the synthetic image data (SII). However, these digital multifunction peripherals 100 may be the same.

<Document Processing Server 200: Printing Restored Original Document>

Figure 14:
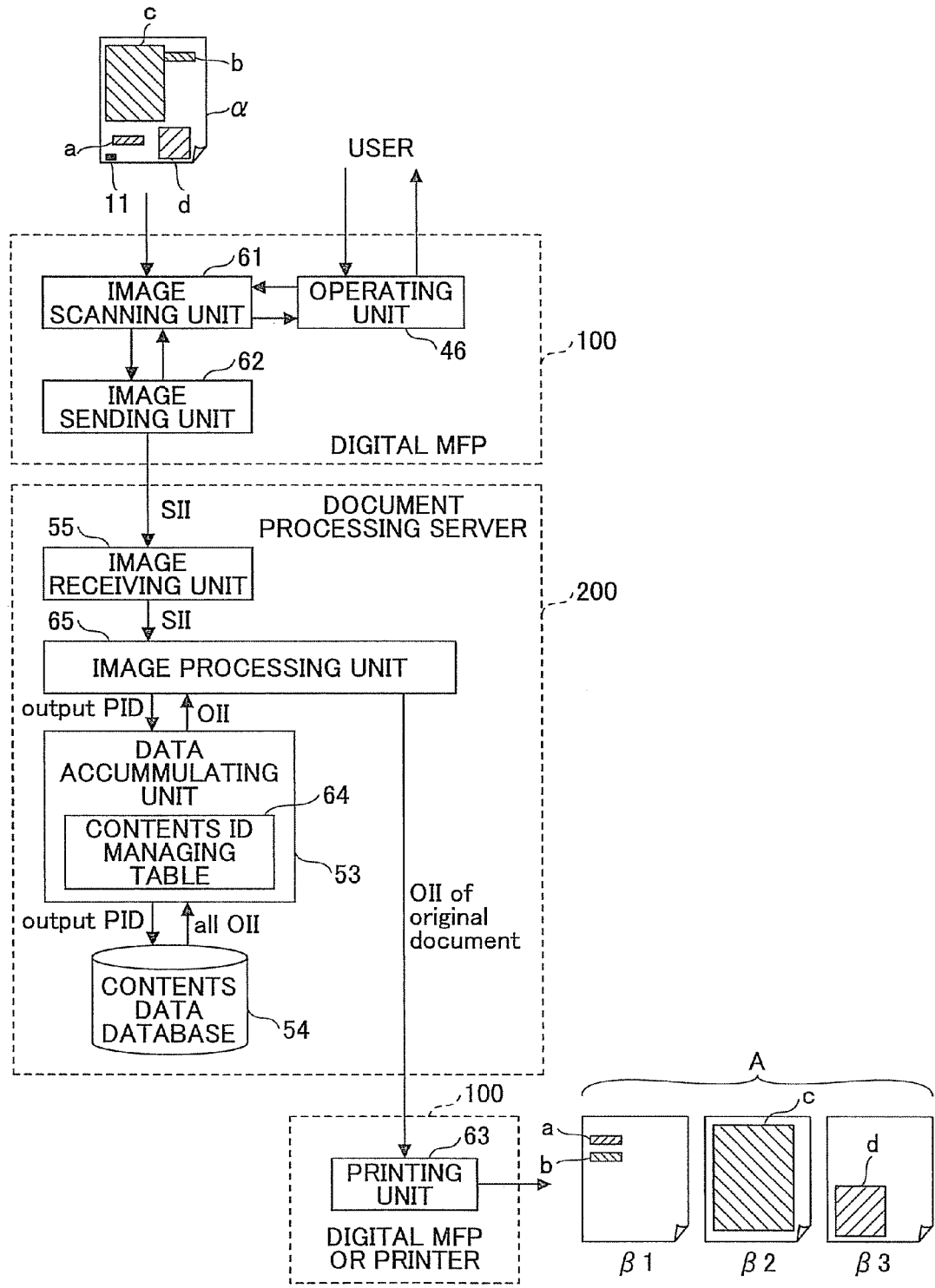
FIG. 14 illustrates an example of a functional block chart of the document managing system in an original document printing mode.

A configuration that the document managing system 500 prints a restored original document β is described. FIG. 14 illustrates an example of a functional block chart of the document managing system 500 in an original document printing mode. The synthetic document α is scanned by the image scanning unit 61 of the digital multifunction peripheral (DIGITAL MFP) 100. The synthetic image data (SII) are sent to the document processing server 200. The document processing server 200 receives the synthetic image data (SII) and the original image data (OII) associated in the contents ID managing table 64 to the digital multifunction peripheral 100. The digital multifunction peripheral (DIGITAL MFP) 100 prints the original image data (OII) on paper to output the restored original document β.

<Digital Multifunction Peripheral 100>

When the restored original document β is printed, the user touches "PRINT RESTORED ORIGINAL DOCUMENT" between the selection keys 71 displayed on the operating unit 46 illustrated in FIG. 6. Then, the digital multifunction peripheral (DIGITAL MFP) 100 changes to the original document printing mode.

In the original document printing mode, the image scanning unit 61 scans the synthetic document α set on the feeder of the scanner 49, generates the synthetic image data (SII), and sends the synthetic image data to the image sending unit 62. In the original document printing mode, the digital multifunction peripheral (DIGITAL MFP) 100 does not print the scanned synthetic image data (SII) as is with the plotter 50. The image scanning unit 61 receives a report of whether the synthetic document α is successfully sent to the document processing server 200 from the image sending unit 62. When the image scanning unit 61 fails to scan the synthetic document α or receives the report of unsuccessfully sending the synthetic document α, the image scanning unit 61 reports the operating unit 46 that the image is unsuccessfully scanned or sent.

The image sending unit 62 sends the original image data received from the image scanning unit 61 to the document processing server 200 via the network 201. When the image sending unit 62 unsuccessfully sends the original image data (OII), the event is reported to the image scanning unit 61. Referring to FIG. 14, the digital multifunction peripheral (DIGITAL MFP) 100 sends the synthetic image data (SII) to the document processing server 200. Instead, the fax machine 400 may send the synthetic image data (SII) to the document processing server 200. In consideration of the case of using the fax machine 400, it is preferable that the symbol 11 is printed a bit larger so that the symbol 11 can be scanned in a resolution of, for example, 200 dpi.

The image receiving unit 55 of the document processing server 200 receives the synthetic image data (SII) sent via the network 201, and sends the received synthetic image data (SII) to an image processing unit 65.

The image processing unit 65 searches for the symbol 11, which is the result of transforming the output paper ID (output PID), in synthetic image data (SII) sent from the image receiving unit 55. The image processing unit 65 searches for a candidate area where the symbol 11 may be placed. Depending on whether the symbol 11 of the output paper ID (output PID) is searched, success or failure of searching the symbol is reported to the digital multifunction peripheral (output PID) 100. The digital multifunction peripheral (output PID) 100 displays the success or the failure of searching on the operating unit 46. The candidate area is in, for example, predetermined ranges from four corners of the synthetic image data (SII). A known technique may be used for searching the symbol 11. For example, edges of reference patterns placed in three corners of the symbol 11 are transformed into "1" and "0" from a predetermined direction, the reference pattern is found using the pattern made of "1" and "0". When the reference pattern is found, the symbol 11 may be successfully searched.

When the image processing unit 65 successfully searches the symbol 11, the output paper ID (output PID) is acquired by inversely transforming the symbol 11. The output paper ID acquired by the image processing unit 65 is sent to the data accumulating unit 53. The data accumulating unit 53 refers to the contents ID managing table 64 using the output paper ID as a key. Then, the data accumulating unit 53 reads all original image data locations associated with the output paper IDs (output PID) from the contents ID managing table 64, and reads the original image data (OII) from the contents data database 54. There is a case where plural contents data sets are inserted from the same original image data (OII) to one synthetic image data (SII). Therefore, the data accumulating unit 53 removes redundant original image data sets. As described, the original image data are acquired from the output paper ID (output PID) of the synthetic image data (SII).

When the image processing unit 65 receives the original image data (OII) from the data accumulating unit 53, all of the image data are sent to the digital multifunction peripheral (DIGITAL MFP) 100. The digital multifunction peripheral 100 receives all of the original image data (OII), and the printing unit 63 prints all of the original image data on paper. In this way, for example, three original documents β1 to β3 are printed from one sheet of the synthetic document α.

<Operation Procedure>

Figure 15:
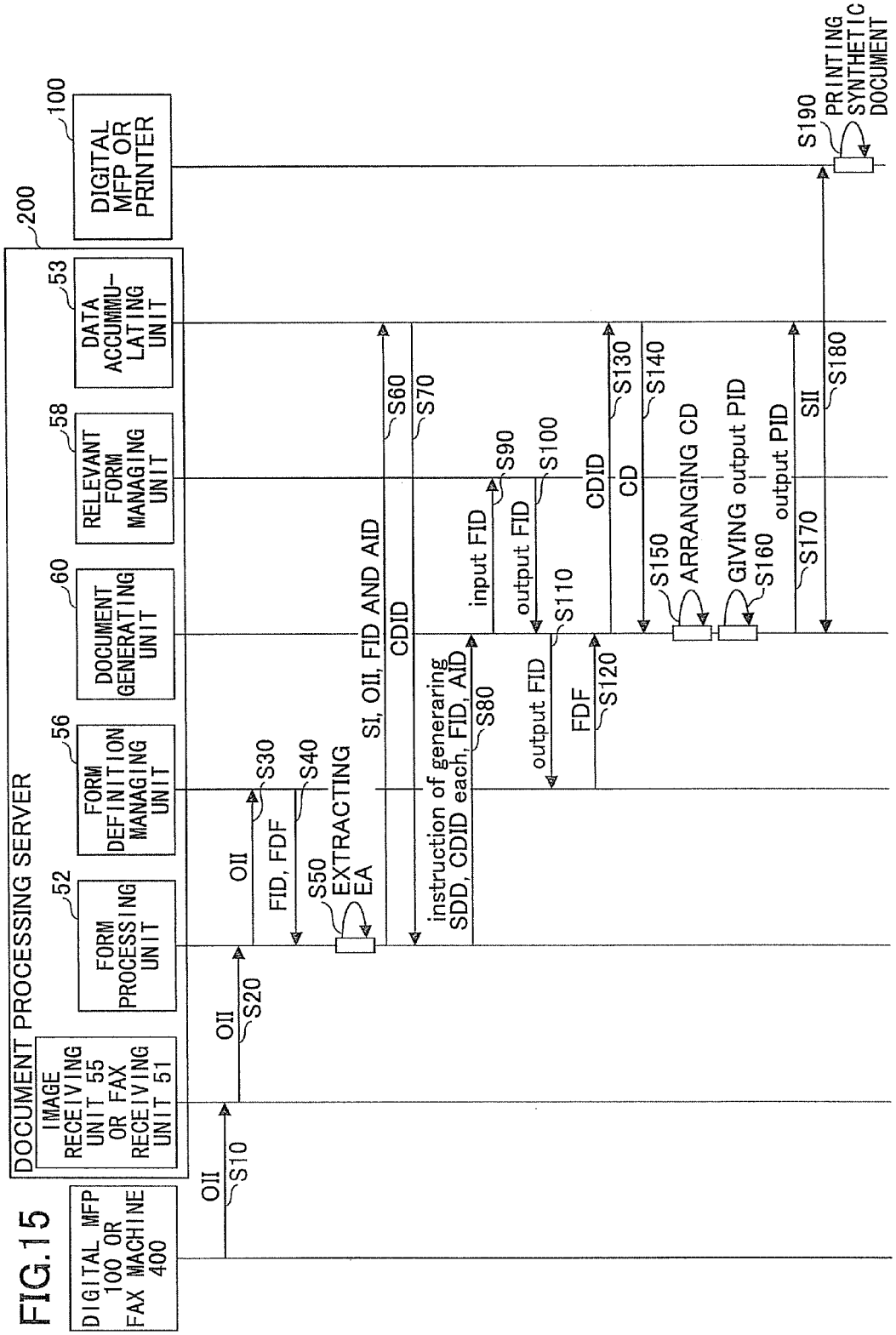
FIG. 15 illustrates an example of a sequence chart of the document managing system in a synthetic document printing mode.

FIG. 15 is an example of a sequence chart of the document managing system 500 in the synthetic document printing mode. The digital multifunction peripheral (DIGITAL MFP) 100 sends the original image data (OII) to the image receiving unit 55 in step S10. The fax machine 400 sends the original image data (OII) to the fax receiving unit 51 in step S10.

The image receiving unit 55 or the fax receiving unit 51 sends the original image data to the form processing unit 52 in step S20. The form processing unit 52 sends the original image data (OII) to the form definition managing unit 56 in step S30. In this way, the form definition managing unit 56 determines the original document A from the original image data based on an image dictionary designated by the form definition list 57. Then, the form definition managing unit 56 determines the scanned form ID (FID) of the original document A. The form definition managing unit 56 reads the form definition file (FDF) associated with the form ID (FID) from the form definition list 57 or the location of the associated form definition file (FDF). The form definition managing unit 56 sends the form ID (FID) and the form definition file (FDF) to the form processing unit 52 in step S40.

The form processing unit 52 extracts the entry areas based on the form definition file in step S50. The form processing unit 52 reads the area IDs (AID) described in the form definition file (FDF) when the entry areas (EA) are extracted.

The form processing unit 52 sends the scanned images (SI) of the entry areas, the original image data (OII), the form ID (FID) and the area ID (AID) to the data accumulating unit 53 in step S60.

The data accumulating unit 53 provides the scanned images with contents data IDs (CDID), and sends the provided contents data IDs to the form processing unit 52. Hereinafter, the scanned image (SI) is referred to as the contents data (CD). The data accumulating unit 53 stores the contents data location, the original data location, the area ID (AID) and the input form ID (input FID) in the contents data database 54 while associating the contents data location, the original data location, the area ID (AID) and the input form ID (input FID).

The form processing unit 52 sends an instruction of generating the synthetic document data (SDD), the contents data IDs (CDID), the form ID (FID) and the area ID (AID) to the document generating unit 60 in step S80.

The document generating unit 60 sends the form ID (FID) as the input form ID (input FID) to the relevant form managing unit 58 in step S90. The relevant form managing unit 58 refers to the input and output correspondence table 59, reads the output form ID (output FID), and sends the output form ID to the document generating unit 60.

The document generating unit 60 sends the output form ID (output FID) to the form definition managing unit 56 in step S110. The form definition managing unit 56 reads the form definition file (FDF) associated with the form ID (FID) by referring to the form definition list 57 or the location of the associated form definition file (FDF). The form definition managing unit 56 sends the form definition file (FDF) to the document generating unit 60 in step S120.

The document generating unit 60 identifies the contents data IDs (CDID) based on the form ID (FID) and the area ID (AID), which are sent from the form processing unit 52, by referring to the form definition file (FDF) respectively for the insertion areas (IA) designated by the form IDs (FID) and the area IDs (AID) in step S130. Further, the contents data IDs (CDID) are sent to the data accumulating unit 53 in step S130.

The data accumulating unit 53 reads the contents data (CD) from the contents data database 54 based on the contents data location associated with the contents data ID by referring to the contents ID managing table 64.

The document generating unit 60 generates the synthetic image data (SII) by placing the contents data based on the form definition file (FDF) in step S150.

The document generating unit 60 generates the output paper ID (output PID) which uniquely identifies the synthetic document in step S160. The symbol 11 is superposed on the synthetic image data (SII) in step S160.

The document generating unit 60 sends the generated output paper ID (output PID) to the data accumulating unit 53 in Step S170. Thus, the data accumulating unit 53 registers the output paper ID (output PID) in the contents data IDs (CDID) of the contents placed in the synthetic image data (SII).

The document generating unit 60 sends the synthetic image data (SII), on which the symbol 11 of the output paper ID (output PID) is superposed, to the digital multifunction peripheral 100 in step S180. Then, the digital multifunction peripheral (DIGITAL MFP) 100 outputs the synthetic document α by printing the synthetic image data (SII) on paper in step S190.

Figure 16:
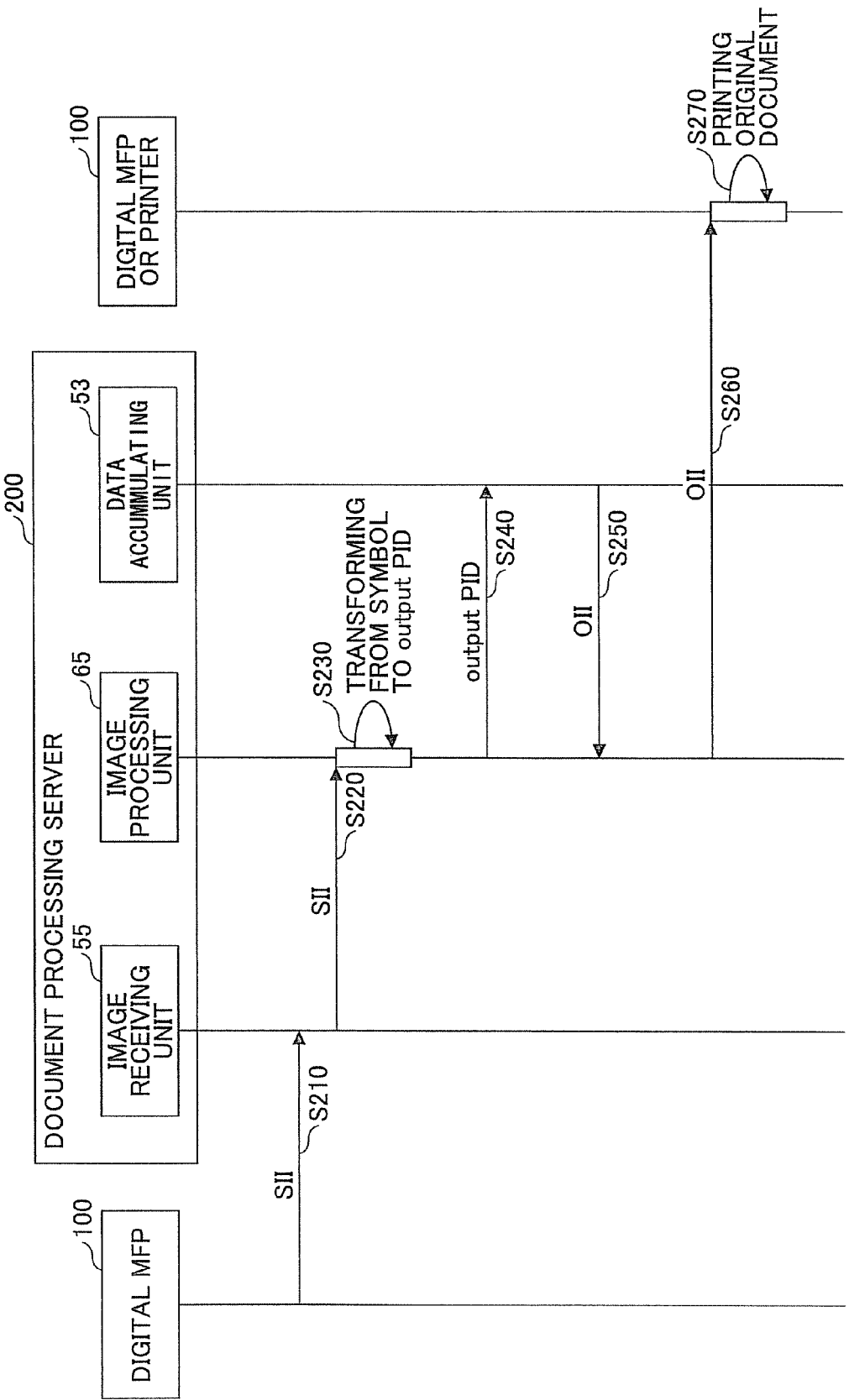
FIG. 16 illustrates an example of a sequence chart of the document managing system in the original document printing mode.

FIG. 16 is an example of a sequence chart of the document managing system 500 in the synthetic document printing mode. The digital multifunction peripheral (DIGITAL MFP) 100 sends the synthetic image data (SII) to the document processing server 200 in step S210.

The image receiving unit 55 sends the synthetic image data (SII) to the image processing unit 65 in step S220.

The image processing unit 65 detects the symbol 11 form a predetermined position of the transforms the synthetic image data (SII), and transforms the symbol 11 to the output paper ID (output PID) in step S230.

The image processing unit 65 sends the output paper ID (output PID) to the data accumulating unit 53 in step S240. The data accumulating unit 53 reads all the original image data (all OII) associated with the output paper ID (output PID) from the contents data (CD) database 54 by referring to the contents ID managing table 64, and sends all the image data to the image processing unit 65.

The image processing unit 65 avoids redundancy of the original image data, and sends the original image data to the digital multifunction peripheral (DIGITAL MFP) 100 in step S260. Then, the digital multifunction peripheral 100 prints the original image data on paper to output the restored original document β in step S270.

As described, the document managing system 500 may output synthetic documents formed by gathering only areas required by a user when plural sheets are contained in the original document. Therefore, it is possible to prevent the printing of documents which are not required from being printed, so that the number of the paper documents is reduced. Therefore, handling in printing the documents becomes easier.

Further, restored original documents having contents included in a synthetic document may be printed after the synthetic document is scanned by a user with a digital multifunction peripheral (DIGITAL MFP) 100. It is possible to obtain the original documents when the synthetic document is illegible.

Embodiment 2

In Embodiment 1, the document processing server 200 synthesizes the original document A, and restores the original document A using the symbol 11 of the synthetic image data (SII). However, the image data of Embodiment 1 may be managed by only the digital multifunction peripheral (DIGITAL MFP) 100.

Figure 17:
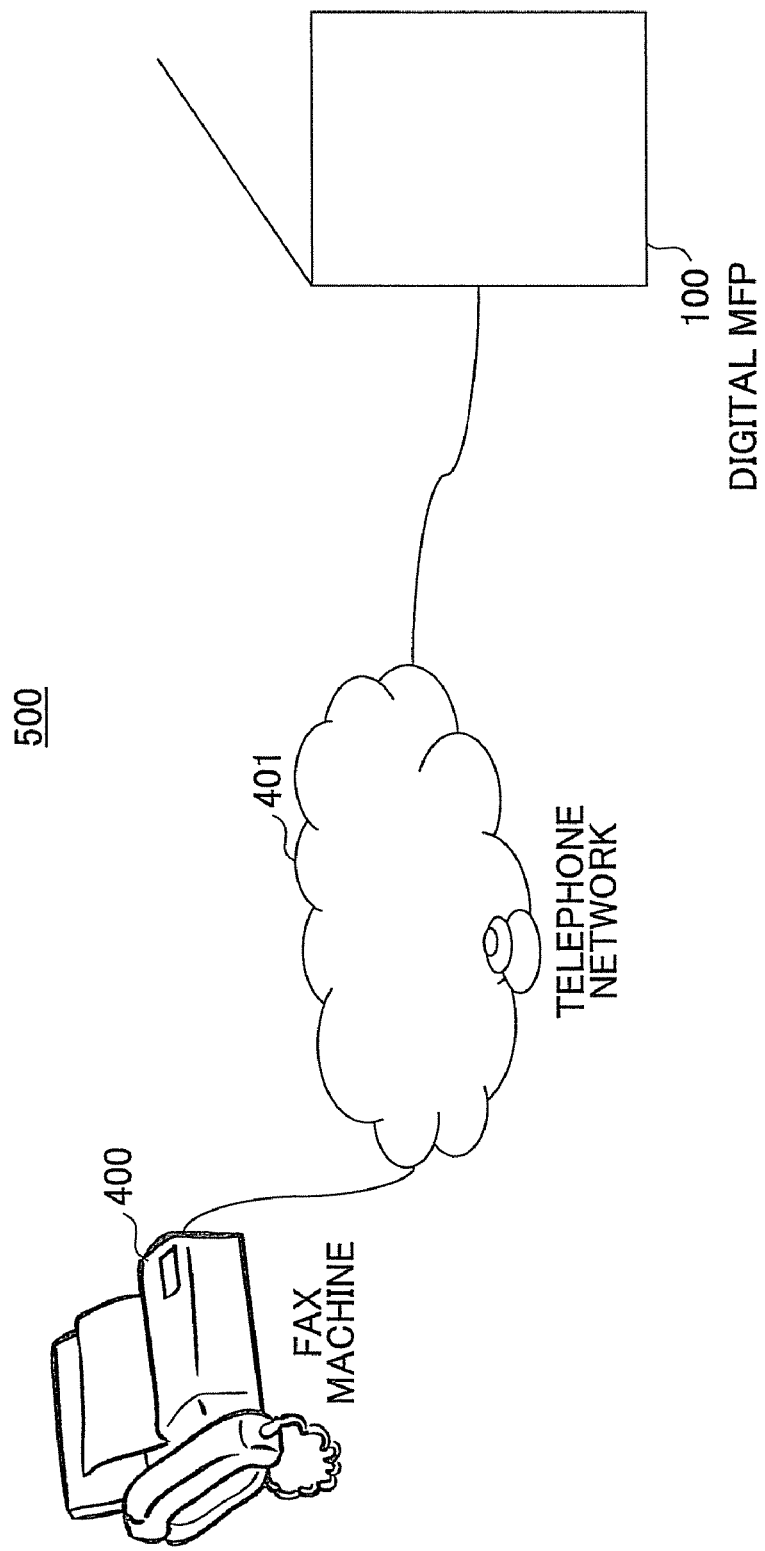
FIG. 17 illustrates an example of the configuration of a document managing system.

FIG. 17 illustrates an example of the configuration of a document managing system 500 of Embodiment 2. Referring to FIG. 17, the same reference symbols are attached to the same portions as those in FIG. 2, and descriptions of these portions are omitted. Referring to FIG. 17, the document processing server 200, the digital multifunction peripheral (DIGITAL MFP) 100 and the digital multifunction peripheral (DIGITAL MFP) 100 in the dotted frame are replaced by another digital multifunction peripheral (DIGITAL MFP) 100. Referring to FIG. 17, there is no document processing server 200, and the digital multifunction peripheral 100 is connected to the telephone network 401. The digital multifunction peripheral 100 uses a fax communication unit 29 to directly receive fax data (image data), sent from an external fax machine 400. In comparison with FIG. 2, the digital multifunction peripheral (DIGITAL MFP) 100 and the document processing server 200 may be integrated in FIG. 17. Therefore, it is unnecessary to send original image data (OII) from the digital multifunction peripheral to the document processing server 200, and to send synthetic image data (SII) and the original image data (OII) from the document processing server 200 to the digital multifunction peripheral 100.

Figure 18:
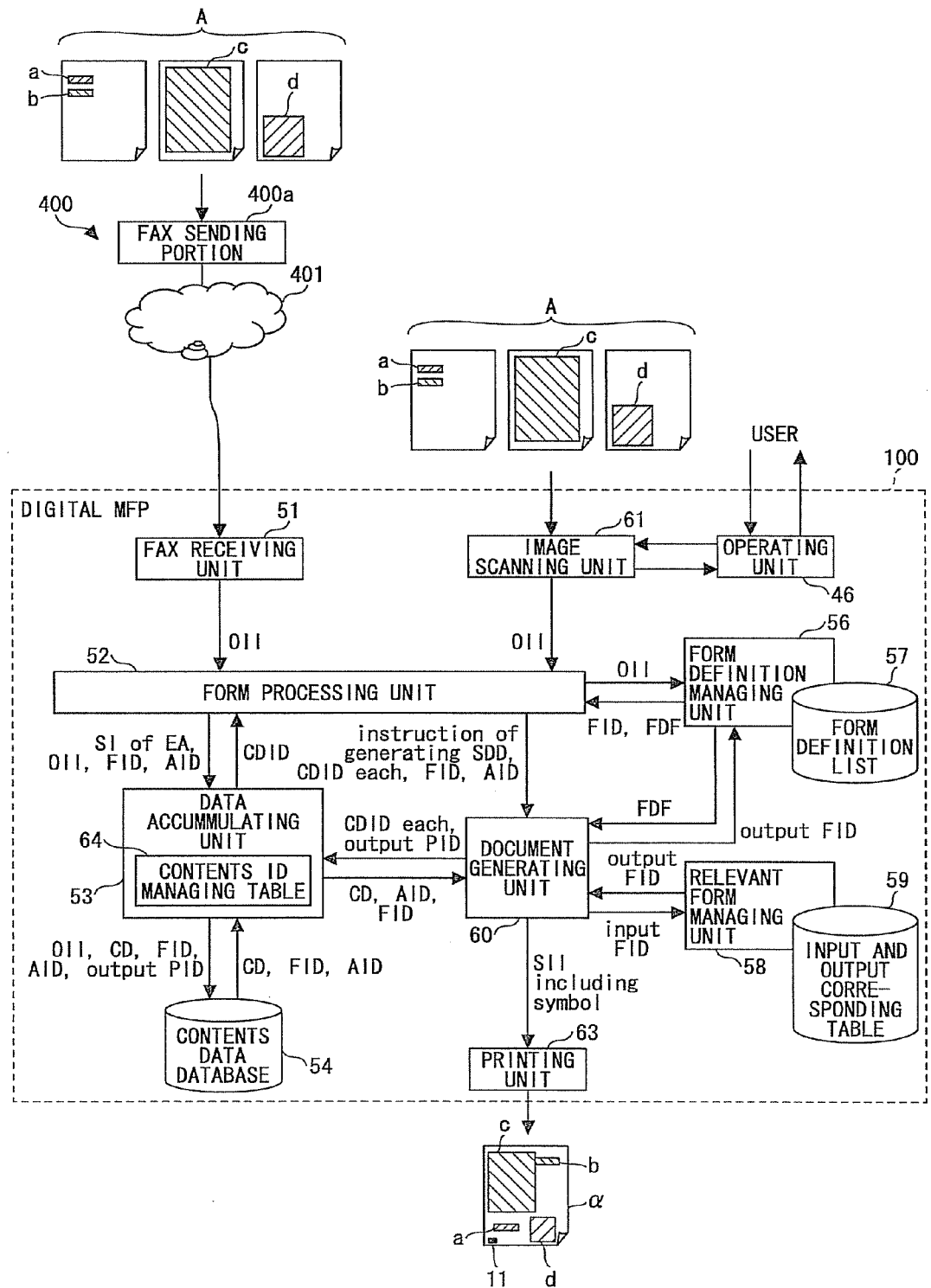
FIG. 18 illustrates an example of a functional block chart of the document managing system.

FIG. 18 illustrates an example of a functional block of the document managing system 500 of Embodiment 2. FIG. 18 illustrates a functional block of the document management system of Embodiment 2 when the digital multifunction peripheral (DIGITAL MFP) 100 prints the synthetic document α. Referring to FIG. 18, the same reference symbols are attached to the same portions as those in FIG. 5, and descriptions of these portions are omitted.

When FIG. 18 is compared with FIG. 5, an image scanning unit 61, an operating unit 46 and a printing unit 63 are accommodated in the digital multifunction peripheral 100. Functions provided by the document managing system 500 of Embodiment 2 are the same as those provided by the document managing system 500 of Embodiment 1 including the document processing server 200. The original image data (OII) are sent from a fax sending portion 400a to the digital multifunction peripheral (digital MFP) 100. Alternatively, the image scanning unit 61 of the digital multifunction peripheral (digital MFP) 100 scans the original document A to acquire the original image data (OII). The digital multifunction peripheral (digital MFP) 100 generates the synthetic image data (SII). Further, the same digital multifunction peripheral 100 prints the synthetic image data (SII) on paper, and outputs the synthetic document α.

Since the digital multifunction peripheral 100 outputs the original image data (OII) and the synthetic document α, a time for the digital multifunction peripheral 100 of communicating with the document processing server 200 may be eliminated. Thus, a waiting time for a user may be shortened.

It is also possible that plural digital multifunction peripherals (DIGITAL MFP) 100 are connected to a network 201.

In this case, one of the plural digital multifunction peripherals 100 scans an original document A, original image data (OII) of the original document A are sent to another one of the plural digital multifunction peripherals 100. Further, the other one of the plural digital multifunction peripherals 100 generates synthetic image data (SII), and outputs the synthetic document α.

Alternatively, one of the plural digital multifunction peripheral 100 scans an original document A, and generates synthetic image data (SII) from original image data (OII) of the original document A. One of the plural digital multifunction peripheral 100 sends the synthetic image data to another one of the plural digital multifunction peripheral 100. Then, the other one of the plural digital multifunction peripheral 100 outputs the synthetic document α.

Figure 19:
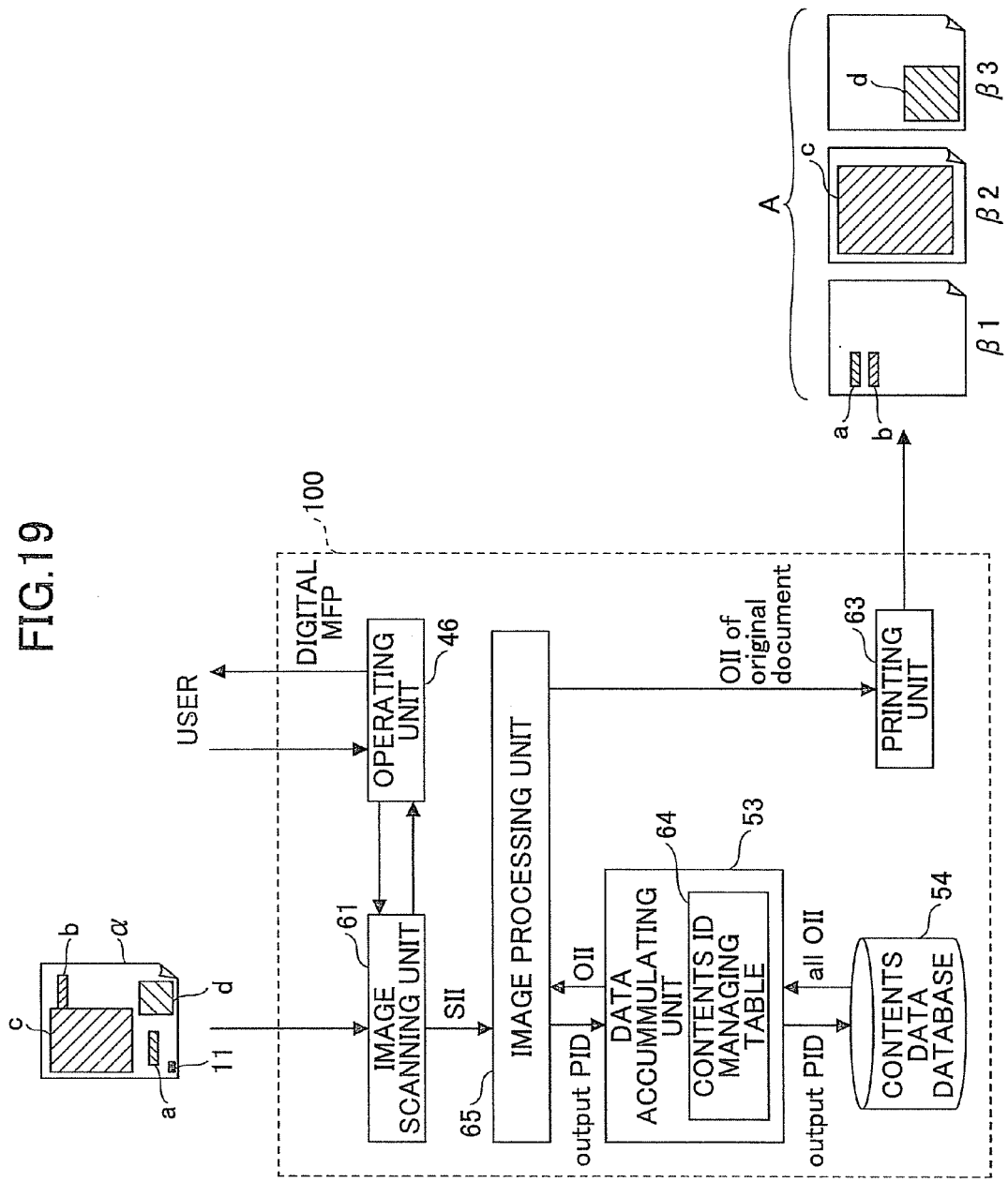
FIG. 19 illustrates an example of a functional block chart of the document managing system in an original document printing mode.

FIG. 19 illustrates an example of a functional block chart of the document managing system 500 of Embodiment 2 in an original document printing mode. FIG. 19 illustrates the functional block of the document management system of Embodiment 2 when the digital multifunction peripheral 100 prints a restored original document β. Referring to FIG. 19, the same reference symbols are attached to the same portions as those in FIG. 14, and descriptions of these portions are omitted.

When FIG. 19 is compared with FIG. 14, an image scanning unit 61, an operating unit 46 and a printing unit 63 are accommodated in the digital multifunction peripheral 100. Functions provided by the document managing system 500 of Embodiment 2 are the same as those provided by the document managing system 500 of Embodiment 1 including the document processing server 200. Said differently, the image scanning unit 61 of the digital multifunction peripheral 100 scans the synthetic document α, and the data accumulating unit 53 identifies the original data. The same digital multifunction peripheral (DIGITAL MFP) 100 prints the original image data on paper to output the restored original document β.

Since the digital multifunction peripheral 100 scans the synthetic document α, and outputs the restored original document β, a time for the digital multifunction peripheral 100 of communicating with the document processing server 200 may be eliminated. Thus, a waiting time for the user may be shortened.

It is also possible that plural digital multifunction peripherals 100 are connected to the network 201. In this case, one of the plural digital multifunction peripherals 100 scans the synthetic document α to acquire the synthetic image data (SII). The acquired original image data are sent to another one of the plural digital multifunction peripherals 100. The other one of the plural digital multifunction peripherals 100 identifies the original image data, and outputs the restored original document β.

With the document managing system 500 of Embodiment 2, a time from scanning of the original document A to outputting of the synthetic document α and a time from scanning the synthetic document α to outputting of the restored original document β are shortened. Thus, a waiting time for the user can be shortened.

Embodiment 3

In Embodiment 3, a preferred modified example of the document managing system 500 of Embodiments 1 and 2 is described.

<Modified Example 1>

All image data are printed as the restored original document β after the synthetic document β is printed and scanned by the scanner in Embodiments 1 and 2. However, there is a case where all the original documents A related to contents data included in the synthetic document are not necessarily output. In this case, it is convenient for a user to enable the user selecting the original document A to be printed.

Figure 20:
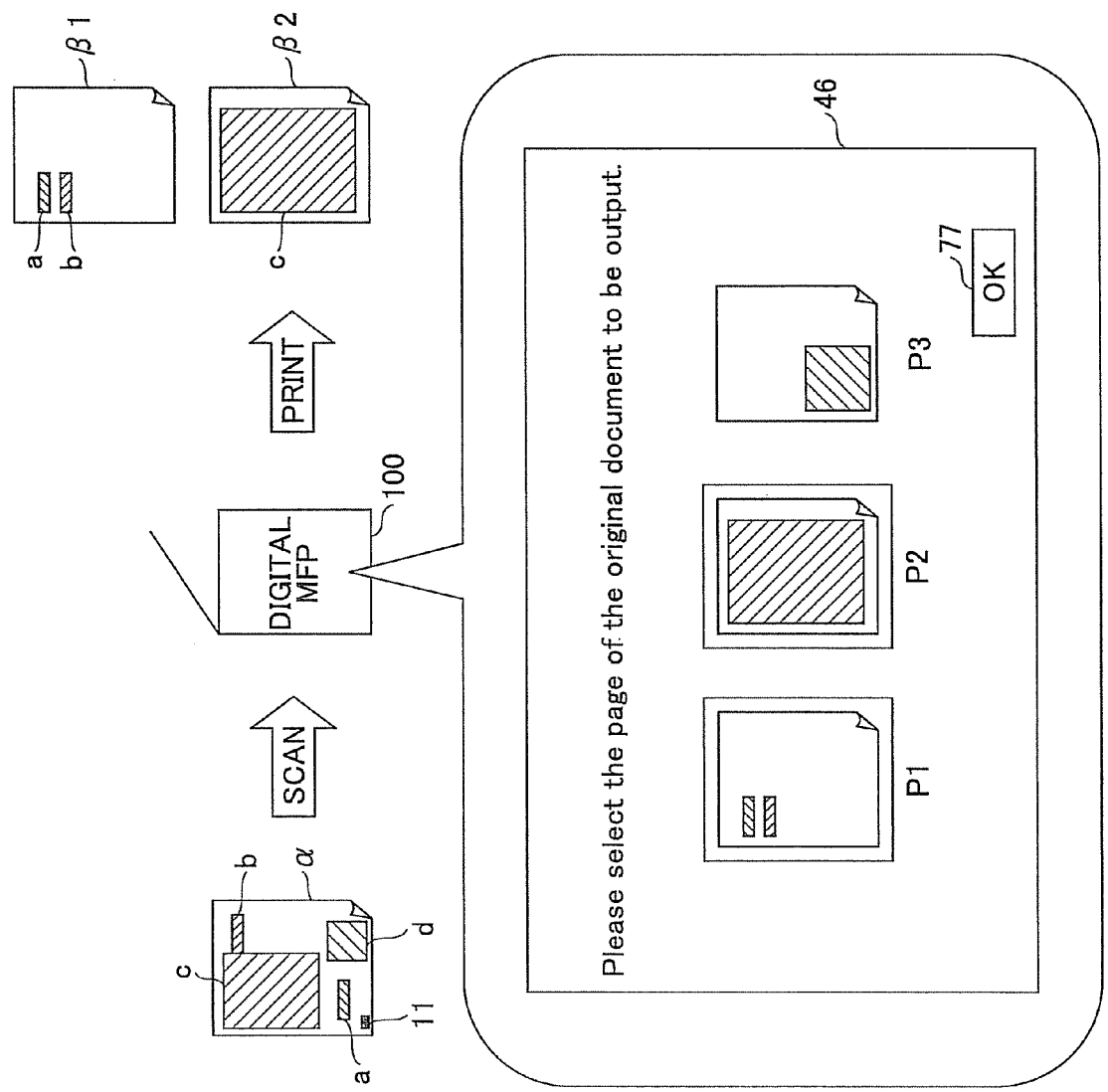
FIG. 20 schematically illustrates an example of a procedure of an original document printing mode.
Figure 21:
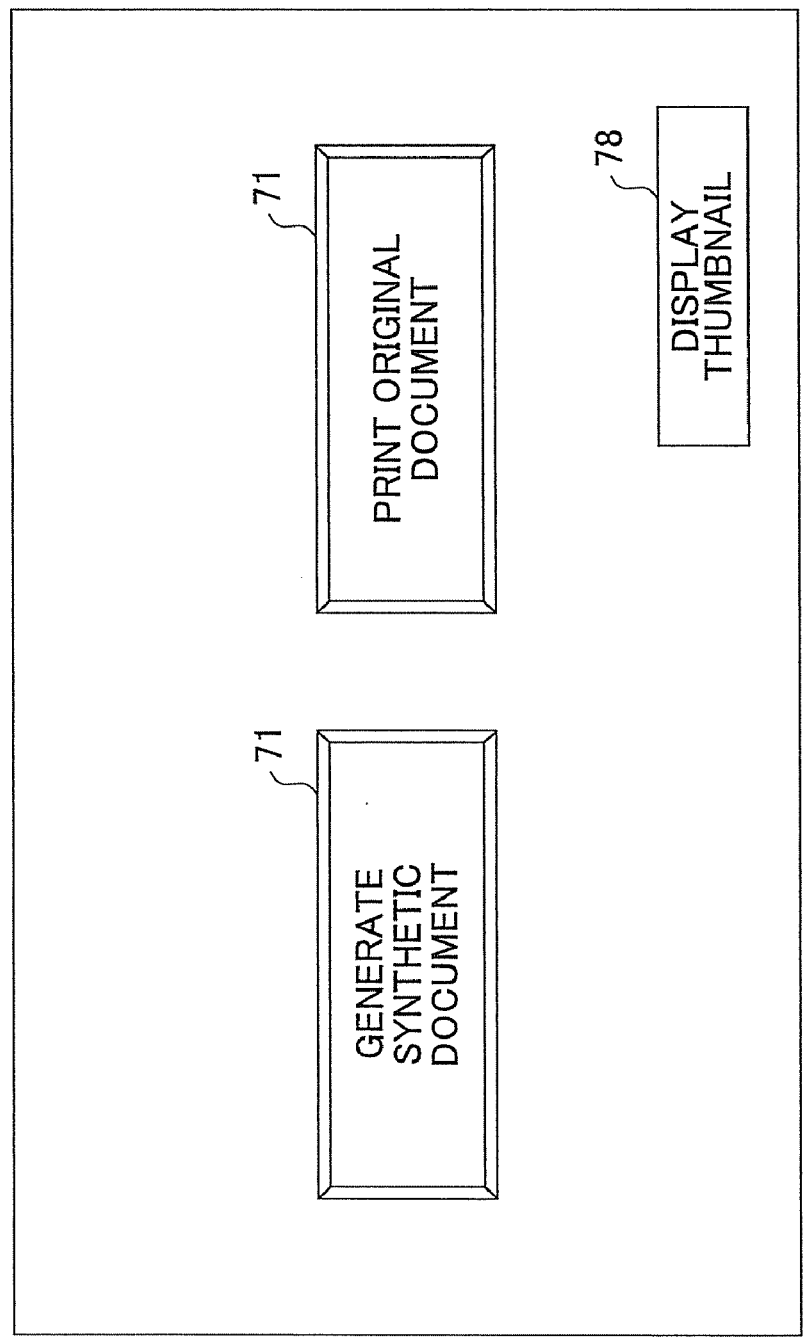
FIG. 21 illustrates an example of selection keys displayed on a touch panel of an operating unit.

FIG. 20 schematically illustrates an example of a procedure of the original document printing mode. In FIG. 20, explanations which are the same as those of FIG. 1 are omitted. Referring to FIG. 21, when the original document printing mode is selected and the digital multifunction peripheral 100 scans the synthetic document α, the digital multifunction peripheral 100 reads the original image data from the contents database 54 as described in Embodiments 1 and 2. The digital multifunction peripheral 100 of the modified example of Embodiment 3 displays a thumbnail image of the original document A on the operating unit 46. It is preferable to display a message of "Please select the page of the original document to be printed" along with displaying of the thumbnail image.

The user visually recognizes the thumbnail image and selects a page of the original document to be printed in FIG. 20. Referring to FIG. 20, thumbnail images corresponding to pages P1 (the first page) and P2 (the second page) are selected. When the user finishes to select the page, the user touches a button "OK" 77. The digital multifunction peripheral (DIGITAL MFP) 100 prints only P1 and P2 of the original image data of the original document A on paper, and outputs restored original document β1 and β2.

The user may select between displaying of the thumbnail images and printing of the restored original document without displaying the thumbnail images when the user selects the original document printing mode in FIG. 21.

FIG. 21 illustrates an example of a selection key 78 displayed on a touch panel of the operating unit 46. In FIG. 21, explanations which are the same as those of FIG. 6 are omitted. For example, the digital multifunction peripheral 100 displays the selection key "DISPLAY THUMBNAIL" near selection key 71 for the original document printing mode or after the selection key 71 is selected. Thus, the user may select whether the thumbnail image is displayed.

In the modified example, when the original document α or the restored original document β having the contents data included in the synthetic document is printed, it is possible to reduce the consumption amount of paper.

Modified Example 2

In Embodiments 1 and 2, the entry areas are extracted using the form definition file (FDF), and the entry areas are rearranged on the synthetic image data. However, it is also possible to rearrange entire original image data without extracting the entry areas.

Figure 22A:
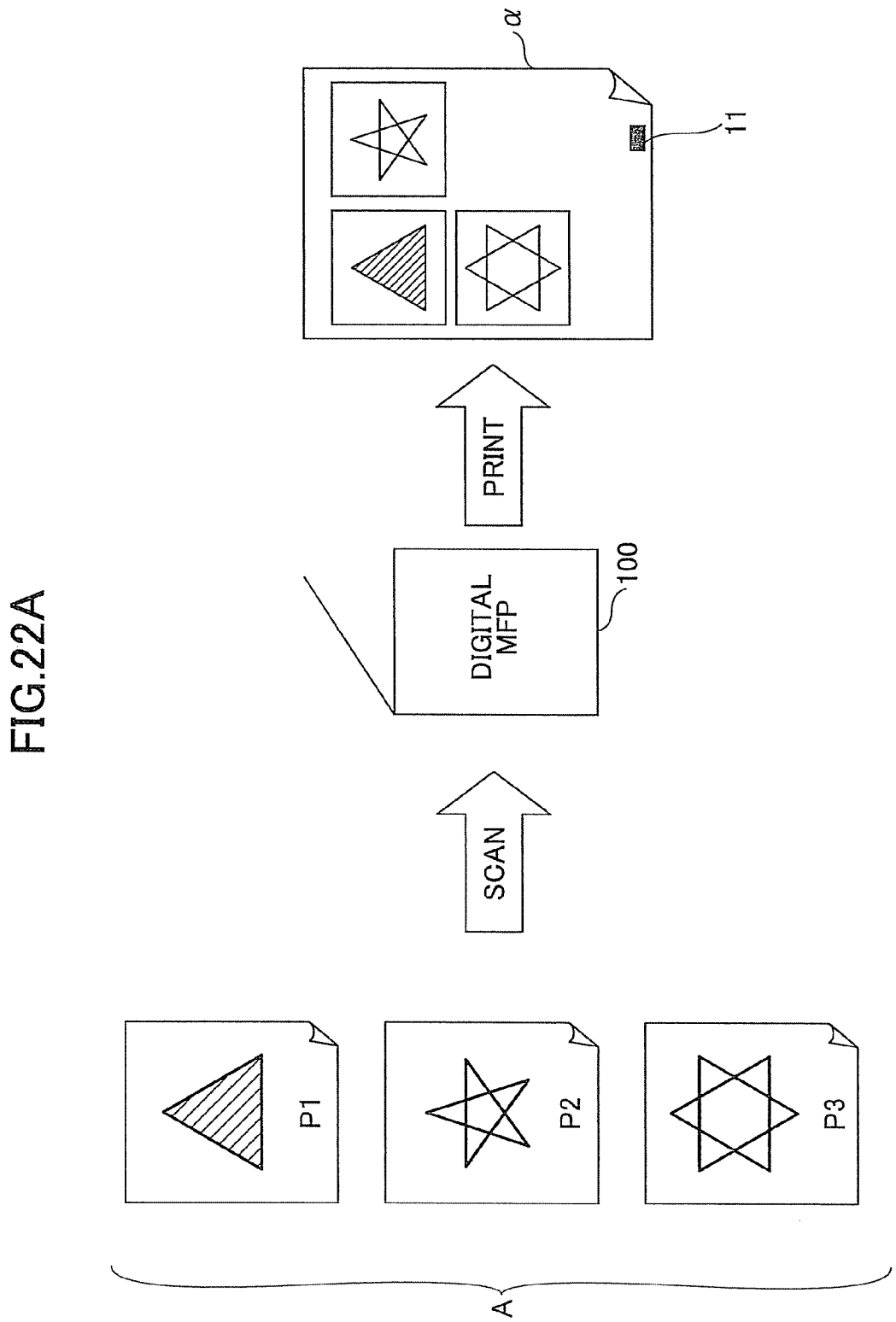

FIG. 22A illustrates an example of a relationship between an original document A and a synthetic document α. The document managing system 500 of the modified example arranges the original document A having plural pages to be in a predetermined layout. Then, synthetic image data are generated. Said differently, the original document A is not determined based on the layout of the original document A. Referring to FIG. 22A, three pages of manuscripts of the original document A are reduced to about one-fourth of the original size. Then, the synthetic document α is printed as so-called aggregate print. Therefore, it is possible to print all the image data of the original document having a relatively small number of pages as the synthetic document α without extracting entry areas (EA). When necessary, it is possible to print the restored original document β by making the digital multifunction peripheral scan the synthetic document α. Referring to FIG. 22A, the original document A having 4 pages may be printed on a sheet of the synthetic document β. However, it is also possible to print the original document A having 2 pages on a sheet of the synthetic document β or to print the original document A having 8 pages on a sheet of the synthetic document β.

Figure 23:
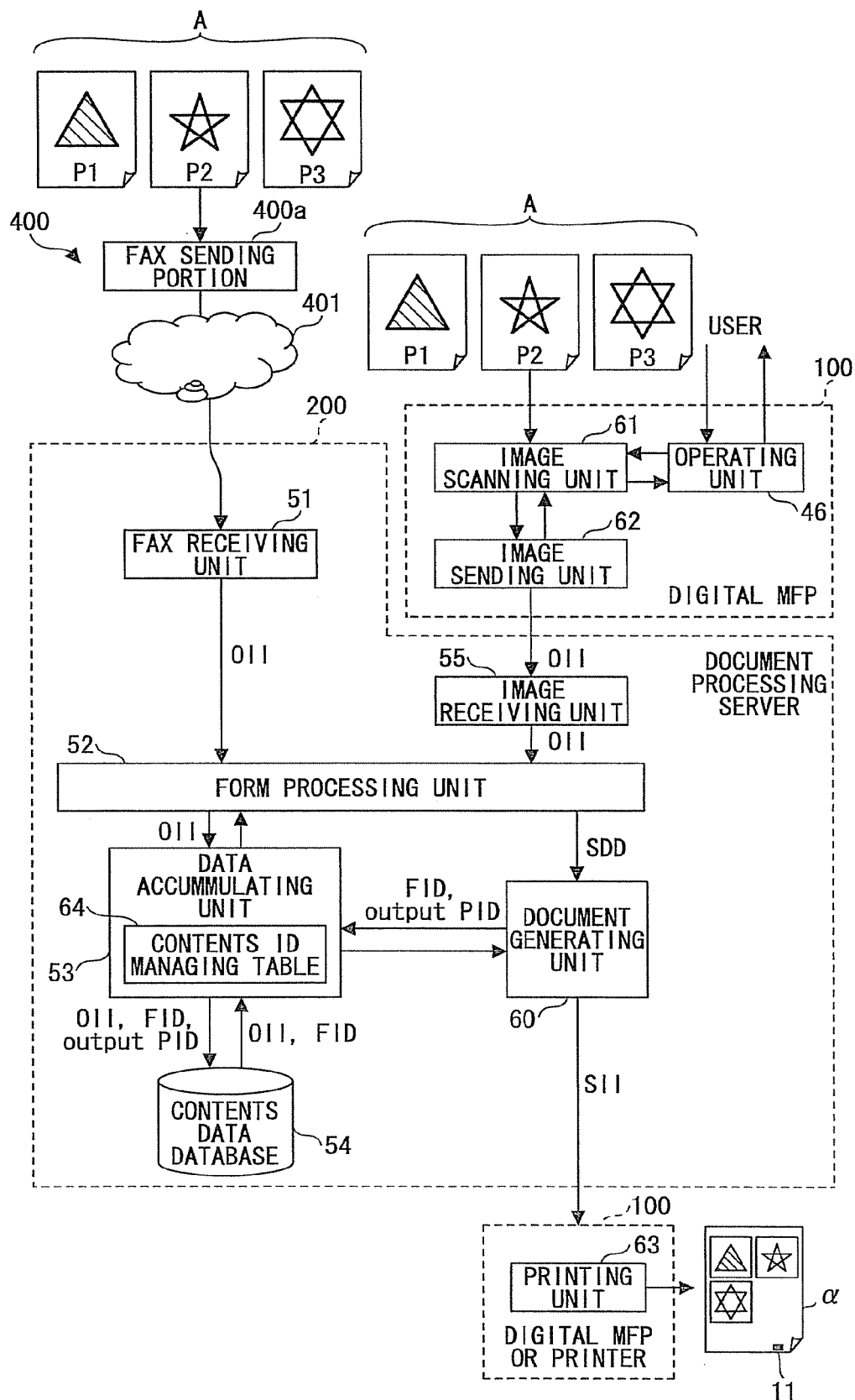
FIG. 23 illustrates a modified example of a functional block chart of the document managing system.

FIG. 23 illustrates an example of a functional block of the document managing system 500 of Embodiment 3. In FIG. 23, explanations which are the same as those of FIG. 5 are omitted. When the functional block of Embodiment 3 illustrated in FIG. 23 is compared with the functional blocks of Embodiments 1 and 2 illustrated in FIG. 5, the form definition managing unit 56 and the relevant form managing unit 58 are unnecessary. A form processing unit 52 sends the original image data (OII) to a data accumulating unit 53. The data accumulating unit 53 provides a unique form ID (FID) to the original image data (OII) and stores the original image data (OII) in a contents data database 54.

The form processing unit 52 sends the original image data (OII) to a document generating unit 60. The document generating unit 60 reduces the image data, generates the synthetic image data (SII), and provides the synthetic image data (SII) with an output paper ID (output PID). The document generating unit 60 sends the output paper ID (output PID) to the data accumulating unit 53. The data accumulating unit 53 registers the output paper ID (output PID) in association with a form ID (FID).

It becomes unnecessary to extract entry areas (EA), manage using a contents data ID, and rearrange the contents data. Therefore, it is sufficient that a contents ID managing table 64 registers only an original data location, an input form ID (input FID) and an output paper ID (output PID). Since there is no change in a functional block of an original document printing mode from that described in the above, the description is omitted.

Referring to FIG. 22S, in a case where the number of pages of the original document A is 4 or more, there is described the number of pages of the original document which have not been printed on the synthetic document α as designated by the reference sign 79. With this, a user may know how many pages of the original document are unprinted. Because the number of pages of the original document A is described in a form definition file (FDF), the form processing unit 52 may report the number of pages of the original document A to the data accumulating unit 53. With this, the data accumulating unit 53 may register the number of pages of the original document A in the contents database 54 in association with, for example, contents data ID (CDID).

In the original document printing mode, the document generating unit 60 acquires the number of pages of the original document A from the data accumulating unit, and compares the acquired number with the number of pages of the original document A aggregated into a predetermined sheet of paper. In a case where the original document has 14 pages and 4 pages of the original document A are aggregated to a sheet of paper, 10 pages of the original document A remain unprinted. The document generating unit 60 generates information indicative of the number of pages of the original document A and the number obtained by subtracting the remaining pages from the pages of the original document A. The information is formed into the synthetic image data (SII). The position of adding the information is described in the form definition file (FDF).

Referring to FIG. 22B, there is displayed "Total number of pages is 14. 10 pages are remaining." The user may provide a material of determining whether the restored original document β is printed based on the number of pages.

This modified example 2 becomes more effective by combining modified example 2 with modified example 1.

Said differently, when the user makes the digital multifunction peripheral (digital MFP) 100 scan the synthetic document α, the digital multifunction peripheral (digital MFP) 100 prints the synthetic document α illustrated in FIG. 21A, and displays "Total number of pages is 14. 10 pages are remaining." on the operating unit 46. The user may know the remaining number of pages by the display of the operating unit 46. Further, the digital multifunction peripheral (DIGITAL MFP) 100 may display thumbnail images of the all pages on the operating unit 46 while enabling scrolling the thumbnail images. The user can selectively print a desired page from the pages of the original document even though the number of pages of the original document is large. Then, the user can reduce the consumption amount of papers.

With this modified example, it is possible to print the restored original document with a simple configuration when the number of pages of the original document is small. Meanwhile, when the number of pages of the original document is large, it is possible to print the original document α or the restored original document β while enabling the user to easily know the total number of pages and reducing the consumption amount.

As described, it is possible to provide the document managing apparatus which extracts a partial area necessary for the business operation and provide the partial area, and which easily provides the original document of it when necessary.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2009-046562 filed on Feb. 27, 2009, the entire contents of which are hereby incorporated herein by reference.

What is claimed is:

1. A document managing apparatus comprising:
an image data acquiring unit configured to acquire original image data of original documents, a layout of the original documents in the original image data being defined;
a layout information storing unit configured to store document IDs for uniquely identifying the original documents and layout information for determining the layout of the original documents;
an original document determining unit configured to determine the document IDs of the original documents by comparing the layout information with the layout in the original image data;
a partial area information storing unit configured to store partial area information designating partial areas of the original image data respectively for the document IDs;
a partial area extracting unit configured to extract the partial areas of the original image data, designated by the partial area information;
an arrangement information storing unit configured to store arrangement information on paper in association with the document IDs respectively for the partial areas;
a synthetic image data generating unit configured to form synthetic image data on which the partial areas are arranged in conformity with the arrangement information and form identification information which uniquely identifies the synthetic image data into the synthetic image data;
a data accumulating unit configured to cause a data storing unit to store the identification information in association with the original image data;
a printing unit configured to print a synthetic document on which the synthetic image data are formed;
a synthetic image data acquiring unit configured to acquire the synthetic image data by scanning the synthetic document; and
an image reading unit configured to read the original image data, which are associated with the identification information formed into the synthetic image data and stored in the data storing unit,
wherein the printing unit prints the restored original document having the original image data.

2. The document managing apparatus according to claim 1, further comprising:
a display unit configured to display the restored original read by the image reading unit before the printing unit prints the images; and
an input receiving unit configured to receipt designation of one or more of the original image data displayed on the original image data,
wherein the printing unit prints the restored original document, in which the original image data are formed and which is received by the input receiving unit.

3. The document managing apparatus according to claim 1, wherein the arrangement information storing unit stores designing image data having a character or a symbol described therein on an area of the paper corresponding to the partial area designated by the arrangement information in association with the document ID, and the synthetic image data generating unit generates the synthetic image data by arranging the partial area on the area of the paper of designing image data.

4. The document managing apparatus according to claim 3, wherein the synthetic image data generating unit arranges only the partial area where written information is entered on the area of the paper in conformity with the arrangement information.

5. The document managing apparatus according to claim 1, wherein the arrangement information storing unit stores designing image data having a graphic symbol described therein on an area of the paper corresponding to the partial area designated by the arrangement information in association with the document ID, and the synthetic image data generating unit generates the synthetic image data by arranging the partial area on the area of the paper of designing image data.

6. The document managing apparatus according to claim 1, wherein the synthetic image data generating unit generates the synthetic image data acquired by arranging the original image data after reducing the size of the image data, and, when the original document has plural pages, adds information of a number of the pages of the original document which are not arranged in the synthetic image data to the synthetic image data.

7. The document managing apparatus according to claim 1, wherein the original document is a paper medium in which a response to a questionnaire about commercial goods and service is entered by a human.

8. The document managing apparatus according to claim 1, wherein the partial area has a handwritten character or number, or a character or sign depicted by a printer with a predetermined font.

9. A document managing system comprising:
an image data sending unit configured to send original image data of original documents, a layout of original documents in the original image data being defined;
an image data receiving unit configured to receive the original image data;
a layout information storing unit configured to store document IDs for uniquely identifying the original documents and layout information for determining the layout of the original documents;
an original document determining unit configured to determine the document IDs of the original documents by comparing the layout information with the layout in the original image data;
a partial area information storing unit configured to store partial area information designating partial areas of the original image data respectively for the document IDs;
a partial area extracting unit configured to extract the partial areas of the original image data, designated by the partial area information;
an arrangement information storing unit configured to store arrangement information on paper in association with the document IDs respectively for the partial areas;
a synthetic image data generating unit configured to form synthetic image data on which the partial areas are arranged in conformity with the arrangement information and to form identification information which uniquely identifies the synthetic image data contained in the synthetic image data;
a data accumulating unit configured to cause a data storing unit to store the identification information in association with the original image data;
a printing unit configured to print a synthetic document on which the synthetic image data are formed;

a synthetic image data acquiring unit configured to acquire the synthetic image data by scanning the synthetic document; and
an image reading unit configured to read the original image data, which are associated with the identification information formed into the synthetic image data and stored in the data storing unit,
wherein the printing unit prints the restored original document having the original image data.

10. The document managing system according to claim 9, wherein the image data sending unit is a fax machine, and the printing unit is an image forming device.

11. A document managing method comprising:
acquiring, with an image data acquiring unit, original image data of original documents, a layout of the original documents in the original image data being defined;
determining, with an original document determining unit, document IDs for uniquely identifying the original documents by comparing layout information, which determines the layout of the original documents and is read from a layout information storing unit storing the layout information, with the layout in the original image data;
extracting, with a partial area extracting unit, partial areas of the original image data, designated by partial area information acquired from a partial area information storing unit storing the partial area information respectively for the document IDs;
forming, with a synthetic image data generating unit, synthetic image data on which the partial areas are arranged in conformity with arrangement information, stored on paper in an arrangement information storing unit in association with the document IDs respectively for the partial areas, and forming identification information which uniquely identifies the synthetic image data into the synthetic image data;
causing a data storing unit to store the identification information in association with the original image data with a data accumulating unit;
printing, with a printing unit, a synthetic document on which the synthetic image data are formed;
acquiring, with a synthetic image data acquiring unit, the synthetic image data by scanning the synthetic document; and
reading, with an image reading unit, the original image data, which are associated with the identification information formed into the synthetic image data and stored in the data storing unit,
wherein the printing prints the restored original document having the original image data.

* * * * *